US011368400B2

(12) United States Patent
Vilke et al.

(10) Patent No.: US 11,368,400 B2
(45) Date of Patent: Jun. 21, 2022

(54) CONTINUOUSLY CALIBRATED NETWORK SYSTEM

(71) Applicant: Amazon Technologies, Inc., Seattle, WA (US)

(72) Inventors: Stephen Daniel Vilke, Bainbridge Island, WA (US); James Morgan Selvidge, Berkeley, CA (US); Rudy Willis, Clayton, CA (US); Paul Hinks, San Rafael, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/369,597

(22) Filed: Mar. 29, 2019

(65) Prior Publication Data

US 2020/0195560 A1    Jun. 18, 2020

Related U.S. Application Data

(63) Continuation-in-part of application No. 16/219,865, filed on Dec. 13, 2018.

(51) Int. Cl.
| | |
|---|---|
| *H04L 12/801* | (2013.01) |
| *H04L 47/127* | (2022.01) |
| *H04L 43/0852* | (2022.01) |
| *H04L 43/0829* | (2022.01) |

(52) U.S. Cl.
CPC ........ *H04L 47/127* (2013.01); *H04L 43/0829* (2013.01); *H04L 43/0852* (2013.01)

(58) Field of Classification Search
CPC ............... H04L 47/127; H04L 43/0829; H04L 43/0852; H04L 41/083; H04L 41/0672; H04L 41/0681; H04L 41/0816; H04L 43/0864; H04L 43/04; H04L 41/142; H04L 47/196; H04L 47/25
See application file for complete search history.

(56) References Cited

U.S. PATENT DOCUMENTS

| | | |
|---|---|---|
| 5,486,826 A | 1/1996 | Remillard |
| 7,516,255 B1 | 4/2009 | Hobbs |
| 7,573,886 B1 | 8/2009 | Ono |
| 8,144,255 B2 | 3/2012 | Hirayama et al. |
| 9,172,740 B1 | 10/2015 | Jia et al. |
| 9,311,692 B1 | 4/2016 | Jia et al. |
| 9,401,128 B1 | 7/2016 | Jepsen |

(Continued)

OTHER PUBLICATIONS

International Search Report and Written Opinion, dated Feb. 26, 2020, in International Patent Application No. PCT/US2019/066070, filed Dec. 12, 2019.

(Continued)

*Primary Examiner* — Benjamin M Thieu
(74) *Attorney, Agent, or Firm* — Davis Wright Tremaine LLP

(57) ABSTRACT

Application data may be transmitted while oscillating a transmission parameter. A metric associated with a complementary network property is analyzed to identify a transition point between a stochastic error state and a deterministic error state of the complementary network property. Additional network properties or states may be inferred from the transition point, and the transmission of the application data may be optimized based on the inferred additional properties or states.

20 Claims, 14 Drawing Sheets

(56) References Cited

U.S. PATENT DOCUMENTS

| | | |
|---|---|---|
| 9,620,041 B2 | 4/2017 | Liu |
| 9,762,636 B2 | 9/2017 | Price |
| 10,264,070 B2 | 4/2019 | Bradley et al. |
| 10,331,394 B1 | 6/2019 | Sarfi et al. |
| 10,346,715 B2 | 7/2019 | Makarewicz et al. |
| 10,404,963 B1 | 9/2019 | Kenrick |
| 10,735,650 B2 | 8/2020 | Kinoshita |
| 2001/0036308 A1 | 11/2001 | Katayama et al. |
| 2003/0088421 A1 | 5/2003 | Maes et al. |
| 2003/0152034 A1 | 8/2003 | Zhang et al. |
| 2004/0154460 A1 | 8/2004 | Virolainen et al. |
| 2007/0110074 A1 | 5/2007 | Bradley et al. |
| 2007/0217607 A1 | 9/2007 | Thiagarajan |
| 2008/0024599 A1 | 1/2008 | Hirakawa |
| 2008/0052414 A1 | 2/2008 | Panigrahi et al. |
| 2008/0137755 A1 | 6/2008 | Onur et al. |
| 2008/0198930 A1 | 8/2008 | Matsubayashi |
| 2008/0198931 A1 | 8/2008 | Chappalli et al. |
| 2008/0278445 A1 | 11/2008 | Sweetser et al. |
| 2009/0100493 A1 | 4/2009 | Jones et al. |
| 2009/0210817 A1 | 8/2009 | Schmieder et al. |
| 2009/0241110 A1 | 9/2009 | Heo et al. |
| 2009/0284442 A1 | 11/2009 | Pagan |
| 2009/0285217 A1 | 11/2009 | Frink et al. |
| 2010/0045690 A1 | 2/2010 | Handschy et al. |
| 2010/0046623 A1 | 2/2010 | Chen et al. |
| 2010/0091042 A1 | 4/2010 | Inoue |
| 2010/0128054 A1 | 5/2010 | Manabe |
| 2010/0164839 A1 | 7/2010 | Lyons et al. |
| 2010/0198575 A1* | 8/2010 | Hollis .................. G06F 30/367 703/14 |
| 2010/0231738 A1 | 9/2010 | Border et al. |
| 2010/0231800 A1 | 9/2010 | White et al. |
| 2010/0254603 A1 | 10/2010 | Rivera |
| 2010/0256344 A1 | 10/2010 | Thompson et al. |
| 2011/0032974 A1 | 2/2011 | Sakaniwa et al. |
| 2011/0043806 A1 | 2/2011 | Guetta et al. |
| 2011/0141372 A1 | 6/2011 | Kato et al. |
| 2011/0209064 A1 | 8/2011 | Jorgensen et al. |
| 2011/0228984 A1 | 9/2011 | Papke et al. |
| 2011/0231419 A1 | 9/2011 | Papke et al. |
| 2012/0226742 A1 | 9/2012 | Momchilov et al. |
| 2012/0257671 A1 | 10/2012 | Brockmann et al. |
| 2012/0257836 A1 | 10/2012 | Yu |
| 2012/0314599 A1 | 12/2012 | Vilke et al. |
| 2012/0324365 A1 | 12/2012 | Momchilov et al. |
| 2013/0033618 A1 | 2/2013 | Kato et al. |
| 2013/0044885 A1 | 2/2013 | Master et al. |
| 2013/0055102 A1 | 2/2013 | Matthews et al. |
| 2013/0064289 A1 | 3/2013 | Chernyshev et al. |
| 2013/0163428 A1 | 6/2013 | Lee et al. |
| 2013/0185633 A1 | 7/2013 | Bunker et al. |
| 2013/0215290 A1 | 8/2013 | Solhusvik et al. |
| 2013/0219012 A1 | 8/2013 | Suresh et al. |
| 2014/0043349 A1 | 2/2014 | Parmar et al. |
| 2014/0188977 A1 | 7/2014 | Song et al. |
| 2014/0244863 A1 | 8/2014 | Bradley et al. |
| 2014/0282753 A1 | 9/2014 | Li et al. |
| 2014/0359494 A1 | 12/2014 | Clark |
| 2015/0117545 A1 | 4/2015 | Fu et al. |
| 2015/0125032 A1 | 5/2015 | Yamanaka et al. |
| 2015/0199074 A1 | 7/2015 | Wu et al. |
| 2015/0215753 A1 | 7/2015 | Leipzig et al. |
| 2015/0244812 A1 | 8/2015 | Brunson et al. |
| 2015/0244940 A1 | 8/2015 | Lombardi et al. |
| 2015/0254726 A1 | 9/2015 | Cassidy et al. |
| 2015/0350555 A1 | 12/2015 | Nishi |
| 2016/0127432 A1 | 5/2016 | Privat |
| 2016/0133224 A1 | 5/2016 | Nakajima |
| 2016/0189393 A1 | 6/2016 | Rao et al. |
| 2016/0218986 A1 | 7/2016 | Klemetti et al. |
| 2016/0219218 A1 | 7/2016 | Kinoshita |
| 2016/0246560 A1 | 8/2016 | Petrov |
| 2017/0034542 A1 | 2/2017 | Yabu |
| 2017/0054793 A1 | 2/2017 | Urbach |
| 2017/0104909 A1 | 4/2017 | Nakajima |
| 2017/0141906 A1* | 5/2017 | Rainish ................ H04L 5/0073 |
| 2017/0150045 A1 | 5/2017 | Goswami et al. |
| 2017/0256281 A1 | 9/2017 | Hoarty |
| 2017/0279757 A1 | 9/2017 | Kereth et al. |
| 2017/0365237 A1 | 12/2017 | Koneru et al. |
| 2018/0027167 A1 | 1/2018 | He et al. |
| 2018/0054481 A1 | 2/2018 | Bradley et al. |
| 2018/0158424 A1 | 6/2018 | Okamoto et al. |
| 2018/0242920 A1 | 8/2018 | Hresko et al. |
| 2018/0332132 A1 | 11/2018 | Sampath et al. |
| 2019/0012531 A1 | 1/2019 | Radwin et al. |
| 2019/0141351 A1 | 5/2019 | Alakuijala et al. |
| 2019/0156785 A1 | 5/2019 | Marchya et al. |
| 2019/0281206 A1 | 9/2019 | Lee et al. |
| 2019/0302881 A1 | 10/2019 | Chan et al. |
| 2020/0059643 A1 | 2/2020 | Marchya et al. |
| 2020/0257807 A1 | 8/2020 | Chen |

OTHER PUBLICATIONS

International Search Report and Written Opinion, dated Feb. 26, 2020, in International Patent Application No. PCT/US2019/066072, filed Dec. 12, 2019.

Wikipedia, "IEEE 802.11," page last modified Feb. 7, 2017, retrieved Feb. 13, 2017, from https://en.wikipedia.org/wiki/IEEE_802.11, 9 pages.

Wikipedia, "IEEE 802.16," page last modified Nov. 21, 2016, retrieved Feb. 13, 2017, from https://en.wikipedia.org/wiki/IEEE_802.16, 8 pages.

Wikipedia, "IEEE 802.21," page last modified Aug. 4, 2016, retrieved Feb. 13, 2017, from https://en.wikipedia.org/wiki/IEEE_802.21, 3 pages.

U.S. Appl. No. 16/219,865, filed Dec. 13, 2018.
U.S. Appl. No. 16/369,628, filed Mar. 29, 2019.
U.S. Appl. No. 16/217,653, filed Dec. 12, 2018.
U.S. Appl. No. 16/217,618, filed Dec. 12, 2018.
U.S. Appl. No. 16/295,965, filed Mar. 7, 2019.
U.S. Appl. No. 16/369,692, filed Mar. 29, 2019.
U.S. Appl. No. 16/369,642, filed Mar. 29, 2019.

IEEE 100, "The Authoritative Dictionary of IEEE Standards Terms," Seventh Edition, IEEE Standards Information Network, IEEE Press, Dec. 2000, 3 pages (pertinent p. 452).

Dehariya et al., "Clustering of Image Data Set Using K-Means and Fuzzy K-Means Algorithms," 2010 IEEE International Conference on Computational Intelligence and Communication Networks pp. 386-391.

* cited by examiner

CONTINUOUSLY CALIBRATED NETWORK SYSTEM

CROSS-REFERENCE TO RELATED APPLICATION

This application is a continuation-in-part of U.S. patent application Ser. No. 16/219,865, filed Dec. 13, 2018 and entitled "CONTINUOUS CALIBRATION OF NETWORK METRICS," the disclosure of which is hereby incorporated by reference in its entirety.

BACKGROUND

In data communications, it can be challenging to effectively understand and utilize the attributes of the network. For example, in the context of data streams such as multimedia streams, determining the bandwidth-delay product can be an important step to ensure that the bitrate of the multimedia stream does not cause congestion on a network, or underflow the network and provide inferior results for the users of the network. If the amount of data being sent over the communications channel is too high (e.g., the bitrate of the multimedia stream exceeds the bandwidth-delay product) the recipient of the multimedia stream may experience poor performance, such as periodic buffering, packet loss, increased latency, and more; if it is too low, the recipient will not benefit from the full capacity of a network. The complexity of these problems is further increased by the tendency of networks to be affected by "external" factors, such as network congestion caused by other users.

BRIEF DESCRIPTION OF THE DRAWINGS

Various techniques will be described with reference to the drawings, in which.

DETAILED DESCRIPTION

Figure 1:
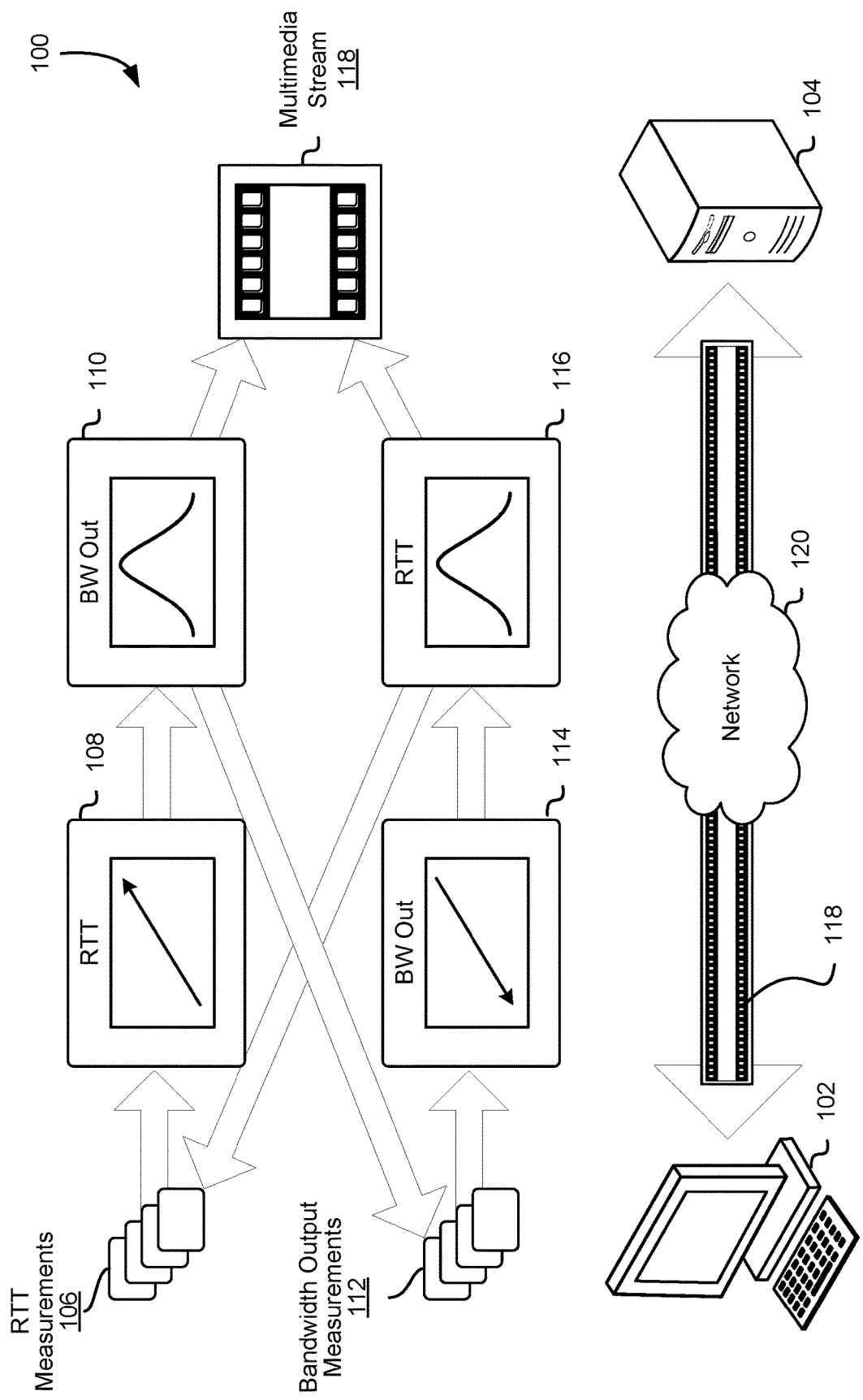
FIG. 1 shows an illustrative example of a computing environment in which various embodiments can be practiced.

Techniques described herein can be utilized to implement methods, machines and manufactures for operating a network system, or other system, using oscillatory calibration techniques. In at least one embodiment, a system transmits application data over a network in accordance with a transmission parameter. The system identifies stochastic or deterministic error states of a metric associated with the transmission parameter, and adjusts the transmission parameter to cause oscillation of the metric between the stochastic and deterministic error states. A transition point between the two states is identified, and transmission of the application data is adjusted based at least in part on identification of the transition point.

As an example, in Transmission Control Protocol (TCP) based communications, a network property such as the bandwidth-delay product can be used to determine how much data can be transferred before the server stops and waits for acknowledgements of received packets. Bandwidth-delay product (BDP) refers to the product of a data link's capacity and the round-trip delay time or latency for the data. The bandwidth-delay product of a communications channel can be equivalent to the maximum amount of data that can be in transit over network circuitry at any given time. Determining a reliable estimate of the bandwidth-delay product can, for example, allow maximization of data throughput given current network condition, and thereby reduce buffering or delays in communications by ensuring that the rate of data transmitted across a network does not exceed the maximum data throughput supported by the network connection. Similar aspects regarding bandwidth-delay product are applicable regarding user datagram protocol (UDP), and other communications protocols.

There are many challenges involved in determining network properties such as bandwidth-delay product. Even in a static system, there can be a non-trivial degree of variance in the measurement of the bandwidth output and latency values that are used to determine the bandwidth-delay product value. For example, for a static network configuration, a first latency measurement and a second latency measurement can be different due to variance in the network. Even in a system where the bandwidth-delay product is known, bandwidth and latency measurements may vary based on statistical distributions. Accordingly, there are difficulties in instrumenting networks and determining real-time metrics such as bandwidth-delay product in a dynamic network environment (e.g., where the bandwidth-delay product is not static and changes as a result of network conditions changing).

Determining a network property, such as the bandwidth-delay product, is useful in various contexts, and can be utilized to improve the operation of computer systems in multiple ways. For example, in the context of a multimedia stream (e.g., streaming of multimedia such as a movie or television show at a variable or constant bitrate), a computer system may determine the bandwidth-delay product of a network and indicate to a content delivery network (CDN) or streaming service the network bandwidth-delay product. The data provider (e.g., a CDN) may receive the network bandwidth-delay product and utilize it to determine how to provide multimedia content to the media client. For example, a streaming service may establish a connection to a client computer system, obtain the network bandwidth-delay product as part establishing the connection, and transmit a multimedia stream at a bitrate that does not exceed the network bandwidth-delay product. In this way, a multimedia streaming service is able to provide high-quality multimedia content to a client and may reduce or entirely eliminate buffering. For example, if a data provider (e.g., multimedia streaming service) submits data at a rate that exceeds the bandwidth-delay product, the client is unable to receive and process the data at the same rate that the data is being sent. As a result, buffering or data loss may occur, which may, in some cases, result in poor performance (e.g., cause interruptions to customers watching a movie, conducting a conference call, playing a video game).

In accordance with various aspects described in greater detail below, a network property can be determined using an oscillatory complementary network property calibration technique. An oscillatory complementary network property calibration technique may refer to a technique in which one of two complementary network properties can be used to determine the other. In this context, the term "complementary" may refer to properties which are linked to each other in some manner—for example, if the increase in one property is correlated to another property, the two properties can be considered complementary; if one property being constant is correlated to another property increasing or decreasing, the two properties can be considered complementary; and so on. It should be noted that these are merely illustrative examples of how two properties can be considered to be complementary properties. In general, complementary network properties are linked together in some way so that knowledge of a trend or set of values of one property can be correlated to values of another network property.

In accordance with various aspects described in greater detail below, a process of transmitting application data at an oscillating rate may be employed to perform monitoring of complementary network properties. More generally, in accordance with various systems and methods described in greater detail below, a throughput rate of a system may be adjusted in oscillatory fashion to perform monitoring of complementary system properties. In various embodiments, monitoring of complementary network or system properties may be continuous, or near continuous. The oscillation of the transmission rate or throughput may be based on causing a network property, sometimes referred to as a metric, to oscillate between stochastic and deterministic error states. As explained in more detail below, stochastic error refers to a distribution of the metric that appears random, such as a Gaussian distribution, and deterministic error refers to error that appears correlated to a systemic error. For example, a deterministic error in a metric might appear as having a linear correlation. By altering a transmission parameter (such as the transmission rate or throughput of the system) such that this oscillation occurs, the values of complementary system properties may be observed. Further, the values of related system properties or states may be inferred based on identifying the point of transition between the stochastic and deterministic error states.

In accordance with various aspects described in greater detail below, a process of using oscillatory transmission of application data is employed to perform continuous monitoring of the network, and to make corresponding adjustments and optimizations to the applications utilization of the network. More generally, these techniques are applied to a system to continually monitor complementary system properties, and to make corresponding adjustments and optimizations to the system. In some instances, continuous monitoring of system properties enables more aggressive utilization of the system. For example, it may be possible to take actions which might normally be presumed to over-utilize a network or other system, in view of having a more informed view of the current state of the system than would otherwise be available, absent the techniques described herein.

As an example, for determining the bandwidth-delay product, a process for performing a continuous oscillatory complementary network property calibration may include determining the network latency or round-trip delay (RTD) time—also referred to throughout this disclosure as the round-trip time (RTT) as the first network property of the oscillatory complementary network property calibration. The round-trip time may refer to the amount of time it takes for data to be sent from a source computer system to a destination computer system and for the source computer system to receive an acknowledgment from the destination computer system that the data was received. The network latency may also be referred to as a ping time, although in the present disclosure pings can be accomplished with application data, in addition to data that is separate from application data (wherein application data can include data that is being streamed or sent from a source computer to a destination computer, such as audiovisual data or other data related to the functioning of the application, rather than data sent primarily for the purpose of measuring network behavior). The round-trip time for messages can be measured using various tools and commands. For example, a ping (or application data perturbation) in various computing environments may operate by sending an Internet Control Message Protocol (ICMP) echo request packet from an origin to a destination. However, the use of the ping command may itself introduce distortions that may affect the observed round-trip time, and other metrics. This may be the case when continuous monitoring is performed, since the amount of network traffic related to the ping command might be high in such cases. Application data may therefore be used in place of discrete probes such as ping commands.

Typically, there can be some variation in the network latency due to variations within the network conditions, including the amount of external traffic that intermediate routers of the network are handling. As a function of the bandwidth input, the latency of a system is generally constant when the bandwidth input is less than or equal to the bandwidth-delay product—this is because the amount of time (on average) for a packet of data to be received over the network does not change based on the amount of data being sent where the network is not oversaturated—in other words, when there is an underflow of data relative to the upper bound of bandwidth-delay product. Bandwidth input may refer to the amount of data per unit of time (e.g., a rate expressed in bit/sec) that is transmitted across a network by a data provider to a data recipient. For example, bandwidth input may refer to the bitrate of multimedia that is transmitted by a content delivery network (e.g., data provider) over a network to a data recipient (e.g., client computer system playing the multimedia stream).

The second network property of the oscillatory complementary network property calibration can be the bandwidth output. The bandwidth output may refer to the rate of data that is received and/or processed by a data recipient. Generally speaking, when a network connection is undersaturated, there is a one-to-one relationship between bits in and bits out, so that it can be the case that bandwidth input equals bandwidth output, as it is the case, in an undersaturated network connection, that there is enough capacity to support the data rate.

The bandwidth-delay product can be calculated using an oscillatory complementary network property calibration by performing measurements of network conditions for a set of network parameters. For example, the network parameters to measure as part of the calibration can be the latency and the bandwidth input, as described above. In one implementation, the system is designed to determine the value of a first network parameter and then determine the value of a second network parameter and then an updated value of the first, then the second, as so on in an oscillatory manner.

Determining a network parameter value may involve measuring a complementary network property, and thereby obtaining a metric value indicative of the property. As a particular example, it is noted that when a network is undersaturated, the latency is constant or approximately constant (e.g., mean measurement of latency over a large sample size will not differ significantly based on bandwidth output value) and that latency increases when the network is oversaturated. This relationship is illustrated and described in greater detail elsewhere in this disclosure, such as in connection with FIG. 3. As a second example, the bandwidth input and bandwidth output may be positively correlated when the network is undersaturated (e.g., as transmission rate of a data provider increases up to the bandwidth-delay product, the rate of data received by a data recipient). The positive correlation can be a 1:1 ratio such that an increase of 1 KB/sec of data being transmitted the rate of data being received also increases by 1 KB/sec (e.g., no buffering or data loss occurs). However, when the network is oversaturated, the bandwidth output may remain constant, as the network has been fully saturated and data being transmitted across the network cannot be delivered to the data recipient at the same rate that the data is being transmitted.

As an illustrative example, it is possible to determine an accurate maximum bandwidth input (e.g., to determine the bandwidth-delay product value) by first instrumenting and measuring latency of the network using correlation between bandwidth input and bandwidth output. As part of an oscillatory complementary network property calibration, the system performing the calibration process may determine a bandwidth output value (e.g., determine data throughput) in KB/sec, submit data at the determined rate, and then measure the latency of the network at that bandwidth output value. The latency can be measured by, for example, submitting one or more network packets for transmission. This might be a "ping" command, in some embodiments, but application data may also be used. The system may submit additional network packets to determine a second latency value of the network at a second, slightly higher bandwidth output value. Embodiments may, for example, adjust the rate at which data packets are being submitted or adjust the size of the submitted data. When application data is used, embodiments may throttle message transmission, where the transmitted messages comprise application data. Additional latency measurements can be made over a range of bandwidth output values whose initial value and incremental steps can be determined based on statistical properties so as to achieve a certain confidence level such as 90%, 95%, 99%, and more (or less, depending on need and design). This can be expressed as: $1-\alpha=0.90$, such as in the former example wherein the significant level a is selected by a system administrator and can be tuned based on the desired network behavior. A set of network latency measurements can be collected and analyzed using statistical tools and algorithms to detect a positive correlation between latency and bandwidth input—that is, that increasing bandwidth input after a certain threshold (e.g., the maximum throughput, which the system may not yet have calculated) results in a trending increase to network latency, the increase being statistically significant. The correlation can be measured by calculating the Pearson product-moment correlation coefficient r over the set of latency values collected and, if the correlation coefficient exceeds a threshold value, it is an indication that the network bandwidth is oversaturated.

Upon determining that the network bandwidth is oversaturated, the system performing the oscillatory complementary network property calibration may calculate the network capacity by measuring bandwidth output at a bandwidth input value for which the correlation coefficient indicates that the network bandwidth is oversaturated. For example, the bandwidth input value used to measure the network capacity can be the highest bandwidth input value used in the set of values that was used to determine the correlation coefficient r. Such need not be the same, however, and other implementations, as described in greater detail below, are contemplated in the scope of this disclosure. The network capacity (e.g., bandwidth capacity) can be calculated by taking multiple bandwidth output measurements at the bandwidth input value selected, as described above. Taking multiple bandwidth output measurements may improve the accuracy of the calculated network capacity at least because there can be variance in network measurements. The variance can be due to various factors, and can be modeled or fitted to a normal distribution. The number of bandwidth output measurements taken may depend on parameters of the data collected, such as the standard deviation, kurtosis, skewness, etc., of the measured bandwidth output values. In some cases, the calibration process includes taking bandwidth output measurements until the confidence interval of the mean bandwidth output measured has a range that is less than a threshold value (e.g., has a width that is less than a threshold width). In this way, an example of a complementary network property (e.g., in this case, network latency) is utilized as part of calibration to determine the network capacity. The network capacity can, accordingly, be measured.

Once the network capacity is determined, the oscillatory complementary network property calibration may perform an oscillatory swing to determine the network latency. Continuing with the example above, the oscillation occurs by measuring the complementary network property (e.g., in this case, the bandwidth output) as a function of bandwidth input value and decreasing the bandwidth input value. As noted above, bandwidth input was increased until it was determined that there was a positive correlation between network latency and bandwidth. Bandwidth input is then decreased while measuring bandwidth output until there is a strong positive correlation detected between bandwidth input and bandwidth output (e.g., indicating that as bandwidth input is decreased, bandwidth output is also decreasing). Once the positive correlation is detected (e.g., correlation coefficient r exceeding a threshold value) the system may measure the network latency at the bandwidth input value at which the system is assured that the network capacity is undersaturated (e.g., correlation coefficient r exceeds a threshold value). With this determination that the network capacity is undersaturated at a specific bandwidth input value or value range, the system may, measure network latency by taking one or more samples. In this way, an example of a complementary network property (e.g., in this case, network capacity) is utilized as part of calibration to determine the network latency. The network latency can, accordingly, be measured.

By performing these steps, a computer system can continuously determine the bandwidth-delay product on the order of hundreds of milliseconds or even less (or on the order of the round-trip time, or up to several round-trip times), with factors such as the network bandwidth, variance and desired accuracy of measured network capacity and latency values being examples that may affect the amount of time that the bandwidth-delay product can be calculated. For a broadband-based connection, the bandwidth-delay product can be accurately calculated using an oscillatory complementary network property calibration.

After calculating both the network capacity and then the network latency as described above, the calculated bandwidth-delay product value can be utilized in various contexts, such as to set the bitrate of a multimedia stream so as to maximize the quantity and quality of the multimedia stream such that, if network conditions are unchanged, the stream will not be subject to ongoing buffering. In the context of a video game, the bandwidth for data being streamed for the game (e.g., including graphical data) can be adjusted based on the bandwidth-delay product value to online players and viewers high quality of experience. In the context of remote applications or virtualization of software applications or desktops, the bandwidth-delay product can be utilized by the virtualization host to determine what type of—and how much—data to send to the remote client. In the context of video streaming, the bandwidth-delay product can yield desired quality of experience. The use case scenarios are not limited to gaming, software virtualization, video streaming, and so on, but are open to any scheme that attempts to send data over a network. So, these are non-exhaustive examples of implementations in which an oscillatory complementary network property calibration can be used to accurately, efficiently, and quickly calculate the bandwidth-delay product value to improve the operation of computer systems, computer networks, and software applications.

In the preceding and following description, various techniques are described. For purposes of explanation, specific configurations and details are set forth in order to provide a thorough understanding of possible ways of implementing the techniques. However, it will also be apparent that the techniques described below can be practiced in different configurations without the specific details. Furthermore, well-known features can be omitted or simplified to avoid obscuring the techniques being described.

As one skilled in the art will appreciate in light of this disclosure, certain embodiments can be capable of achieving certain advantages, including some or all of the following: reducing buffering of data; increasing effective data bandwidth of a network; improved reliability of network by reducing rate of dropped packets; more accurately measuring the bandwidth-delay product of a network connection; and more. Techniques described herein can be utilized to improve the operation of computer systems by improving data communication capabilities of computer systems, such as by increasing data bandwidth, decreasing or eliminating buffering (e.g., of a multimedia stream), decreasing or eliminating dropped data packets, any combination thereof, and more.

FIG. 1 shows an illustrative example of a computing environment 100 in which various embodiments can be practiced. The computing environment 100 may include a first computer system 102 and a second computer system 104 that are connected via a network 120 such as the Internet. The first computer system 102 and/or the second computer system 104 may include executable code that, if executed by one or more processors of the computer system, cause the one or more processors to determine a network property, such as the bandwidth-delay product, using an oscillatory complementary network property calibration, as described in greater detail below, such as those described in connection with FIG. 2 and FIG. 5.

The first computer system 102, in an embodiment, is any suitable computing system such as those described in connection with FIG. 14. The first computer system 102, for example, could be a personal computer, a laptop, a smartphone, an embedded device, an internet-of-things (IOT) device or any various other types of computing devices. The first computer system 102 may include hardware and/or software that is configured to enable the first computer system 102 to communicate with a network, for example, via a network interface card, a wireless antenna, and more. For clarity, the first computer system 102 may, in some embodiments, be a data recipient and the second computer system 104 can be a data provider (which can be a same or similar type of device described above with respect to computer system 102). For example, the first computer system 102 can be a personal computer that includes software (e.g., client code) that the first computer system 102 uses to communicate with the second computer system 104. In an embodiment, the first computer system 102 includes software such as a video game application, a streaming application, etc. that includes executable code that causes the first computer system 102 to communicate with the second computer system 104 to receive data such as a multimedia stream comprising video and/or audio.

The second computer system 104 can be any suitable computer system such as those described in connection with FIG. 14 and can be configured with executable code that, if executed, allows the second computer system 104 to communicate with the first computer system 102. The second computer system 104, in an embodiment, is a data provider such as a content delivery network (CDN) or a computing resource service provider that provides data streams as a service of the service provider. The function or operation of the first computer system 102 and the second computer system 104 can, of course, be reversed or re-distributed in any suitable manner—for example, the first computer system 102 can be the data provider and the second computer system 104 can be the data recipient. In an embodiment, the second computer system 104 is a computer server hosting a CDN and has access to a data storage system with data. The data may, in an embodiment, be multimedia content that is stored (e.g., persisted on a hard disk drive) or otherwise accessible to the second computer system.

The second computer system 104 may encode source multimedia content using a codec which can encoded in a variable or fixed bitrate which is determined and/or adjusted based on a network property, such as bandwidth-delay product, determined using an oscillatory complementary network property calibration as described in detail herein. The first computer system 102 and/or the second computer system 104 can, for example, be configured to perform calibration processes such as those described in accordance with FIG. 5 described in greater detail below.

In an embodiment, the second computer system 104 is a multimedia streaming service that, for a client of the multimedia streaming service (e.g., the first computer system 102) determines the bandwidth-delay product of the network connection with the client and generates and/or provides a multimedia stream to the client that has a bitrate or data transfer rate that does not exceed the bandwidth-delay product. Not exceeding the bandwidth-delay product may have various advantages, such as reducing or eliminating buffering of the multimedia content on the client.

In an embodiment, the first computer system 102 and the second computer system 104 establish a communications channel and/or perform a handshake. The computer systems may communicate using any suitable protocol, such as User Datagram Protocol (UDP) or Transmission Control Protocol (TCP). As part of establishing a communications channel, one or both computer systems may calculate the bandwidth-delay product for data transfers with the other computer system. In an embodiment, a computer system (e.g., a client of a multimedia streaming service) calculates the bandwidth-delay product using an oscillatory complementary network property calibration technique, such as in the manner that will described in greater detail below.

Performing an oscillatory complementary network property calibration (e.g., by one or more of the computer systems described in connection with FIG. 1) may involve a two-phase and continuous oscillatory network perturbation. As part of the first phase, the system performing the calibration may perturb the network conditions by taking a first set of RTT measurements 106 while perturbing the network's bandwidth input. The perturbation may be accomplished by incrementally adjusting the value of a transmission parameter, for example.

In an embodiment, the first set of measurements is a set of measurements of network latency collected over different bandwidth inputs. However, it need not be the case that the set of measurements are all taken at distinct and different bandwidth inputs. For example, in some cases it can be advantageous to take multiple measurements at a bandwidth input and perform statistical techniques such as averaging or smoothing to determine an aggregate measurement. For example, a plurality of latency measurements can be taken at one bandwidth input level to obtain the mean and standard deviation of the measurement to determine a more accurate aggregate measurement than a single measurement. Accuracy in this case may refer to the fact that multiple samples may, on average, result in more accurate evaluations than a single measurement when there is randomness in the signal (e.g., spread out over a normal distribution). Each of the first set of measurements can be a datagram, message, packet, or any other suitable form for transmission across a network. In some embodiments, each of the measurements are taken sequentially, as it can be the case that attempting to take the measurements in parallel would affect other measurements (e.g., affect bandwidth input of the data pipe).

In some embodiments, when the network is undersaturated, the latency is generally constant or approximately constant, and thus the observed latency may be seen to be stochastically distributed. In some embodiments, when the network is oversaturated the latency is positively correlated with the with bandwidth input—that is, there is a direct relationship between network latency and bandwidth input. This may refer to an increase in bandwidth input being positively correlated with an increase in network latency. As part of the oscillatory complementary network property calibration, the system, in some embodiments, analyzes the first set of RTT measurements 106 using statistical techniques to detect a first correlation 108 between the measured network property and a complementary property. For example, in this case, the network latency as a function of bandwidth input is collected and statistical techniques are used to determine, using any suitable statistical techniques, a correlation coefficient between latency and bandwidth input. If the correlation coefficient is positive, it means that there is a positive correlation between the two variables and an increase in one is correlated with an increase in the other; if the correlation coefficient is negative, it means that there is an inverse relationship between the two variables and an increase in one tends to be associated with a decrease in the other; if the correlation coefficient is zero, it means that the values of one variable do not help in determining the value of the other variable.

The bandwidth input may refer to a rate of data that is sent by the perturbing client over the network to cause the network to be saturated to a certain level. If the rate is greater than the network's capacity, then the network is oversaturated; conversely if the rate is less than the network's capacity, the network is undersaturated. Note that the network, in some embodiments, is dynamic and various network parameters such as capacity and latency may change over time. In some cases, the change can be sudden, such as in the case where, for example, a consumer's broadband connection is affected by another user of the household connecting to a streaming service, thereby reducing the amount of available bandwidth for other devices in the household.

As part of the calibration, the system may determine whether the first correlation 108 exceeds a certain threshold. Exceeding the threshold can be determining that the calculated correlation coefficient is greater than or less than a certain threshold value (inclusive or exclusive of the threshold value). In some embodiments, the threshold value is selected based on a probabilistic factor such as the confidence level $1-\alpha$ such that the probability that the first correlation coefficient exceeds the threshold value after a number of measurements n is equal to (or greater than, greater than or equal to, etc.) $1-\alpha$ given that other probabilistic parameters are known (e.g., previously measured mean and standard deviation from a previous oscillation). In this way, the system can configure parameters to ensure that, at a probabilistic level $1-\alpha$ (e.g., 99% probability) that a set of measurements is taken within n*L time, where n is the number of measurements and L is the latency for each measurement.

If the first correlation 108 exceeds the threshold value or probability, then the system may use this as an indication that latency and bandwidth input are sufficiently correlated to conclude that latency is increasing as bandwidth input increase. In some embodiments, the system uses this information to measure a first complementary network property 110. The complementary network property of network latency shown in FIG. 1 is bandwidth output. Bandwidth output can be measured at the highest bandwidth input value that was included in the first set of measurements which was determined to be increasing as a function of bandwidth input. Other bandwidth input values can be used to measure bandwidth output—for example, a value higher than the highest bandwidth input value from the first set can be utilized, as the network was determined to be oversaturated at bandwidth input it also follows that the network would also be oversaturated at an even larger value.

In some embodiments, the system takes a single measurement of the bandwidth output. However, in other embodiments, the system takes multiple measurements of bandwidth output. The measurements can be normally distributed, and statistical techniques can be utilized as part of determining bandwidth output. For example, the number of measurements taken can be greater when the standard deviation of the measurements is larger, and fewer measurements taken when standard deviation is smaller. Accordingly, the mean of the one or more measured values can be the network capacity.

Upon determining the network capacity, the system may perform the second phase of the oscillation by perturbing the network to be undersaturated. Similar to the first phase, the system may collect a second set of measurements 112. The second set of measurements can be a measurement of the complementary property—in this case, bandwidth output. Bandwidth output can be measured as a function of bandwidth input and the measurements collected over decreasing values of bandwidth input. In an embodiment, the bandwidth input values have values that are less than the determined network capacity. The system may analyze the second set of measurements 112 to determine a second correlation coefficient 114, the second correlation coefficient being a correlation between bandwidth output and bandwidth input. If there is a positive correlation (e.g., a decrease in bandwidth output tends to be associated with a decrease in bandwidth input), then the system measures the complementary network property (e.g., network latency 116) at a bandwidth input value which, in some embodiments, is selected to be less than or equal to the lowest bandwidth input value in the second set. The network latency can be calculated using statistical techniques as described in connection with the first phase.

Upon completing the first and second phase (which may, in some embodiments, be reversed in order) the system can be able to calculate additional network properties. For example, determining the network capacity and network latency are sufficient to determine the bandwidth-delay product. The bandwidth-delay product, in an embodiment, is utilized to configure communications sessions such as UDP-based communications sessions. After completing the oscillatory complementary network property calibration, the oscillation can be performed again, in a continuous manner, as the network conditions may have changed.

Determining the bandwidth-delay product of a network is useful in various contexts, and can be utilized to improve the operation of computer systems in multiple ways. For example, in the context of a multimedia stream 118 (e.g., streaming of multimedia such as a movie or television show at a variable or constant bitrate), a computer system may determine the bandwidth-delay product of a network and indicate to a content delivery network (CDN) or streaming service the network bandwidth-delay product. The data provider (e.g., a CDN) may receive the network bandwidth-delay product and utilize the bandwidth-delay product to determine how to provide multimedia content to the media client. For example, a streaming service may establish a connection to a client computer system, obtain the network bandwidth-delay product as part establishing the connection, and transmit a multimedia stream at a bitrate that does not exceed the network bandwidth-delay product. In this way, a multimedia streaming service is able to provide high-quality multimedia content to a client and may reduce or entirely eliminate buffer. For example, if a data provider (e.g., multimedia streaming service) submits data at a rate that exceeds the bandwidth-delay product, the client is unable to receive and process the data at the same rate that the data is being sent. As a result, buffering or data loss may occur, which may, in some cases, result in poor performance (e.g., cause interruptions to customers watching a movie, conducting a conference call, playing a video game).

In an embodiment, the first computer system 102 and the second computer system 104, are each a device operable to send and/or receive requests, messages, or information over an appropriate network 120 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network.

Figure 2:
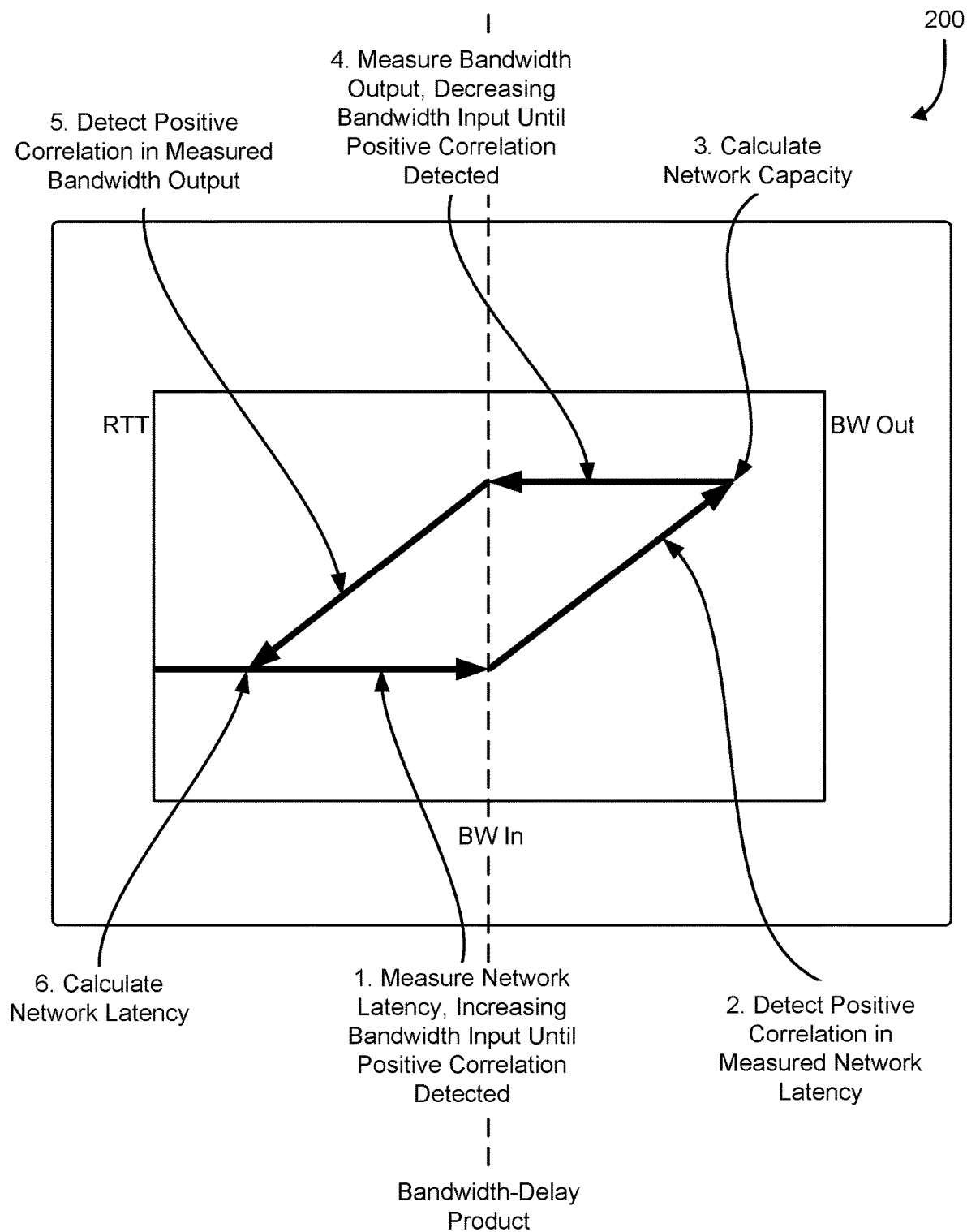
FIG. 2 shows an illustrative example of a diagram in which the network latency and network capacity can be measured by oscillatory complementary network property calibration, in accordance with at least one embodiment.

FIG. 2 shows an illustrative example of a diagram 200 in which the network latency and network capacity can be measured by oscillatory complementary network property calibration, in accordance with at least one embodiment. Techniques described in connection with FIG. 2 can be implemented in accordance with embodiments described elsewhere in this disclosure, such as those discussed in connection with FIG. 1, FIG. 5, and FIG. 14. Oscillation may refer to the aforementioned process of increasing bandwidth input to determine the network capacity, then decreasing bandwidth input to determine the network latency, then increasing bandwidth input to update the network capacity, then decreasing bandwidth input to update the network latency, and so on. This iterative process can be performed continuously (e.g., repeated without waiting between measurements or by performing on a timed schedule, such as every several seconds, milliseconds, or as appropriate for a given system).

As part of an oscillatory complementary network property calibration, a suitable computer system may obtain a set of latency measurements. For embodiments in accordance with FIG. 2, the first set of measurements refers to the round-trip time or latency of the network connection. The set of measurements can be latency measurements collected at different bandwidth inputs. Obtaining a latency measurement at a bandwidth input can be performed using various techniques. For example, the system may estimate the network latency at rest by sending data to the counterparty without pressuring the network with other data. In some embodiments, this is an implied assumption that the bandwidth of the system can be measured in an undersaturated state. The sent data can be received by the counterparty and a response is transmitted, the round-trip time between sending the data and receiving a response can be the latency at rest. In some embodiments, multiple ping measurements are taken to determine a statistically reliable latency measurement. Based on the latency, the bandwidth input can be stressed or saturated to determine how much data can be transmitted over the network. As an example, consider the case where the latency of an empty pipe is measured to be 100 milliseconds (ms). To measure the latency at a bandwidth input of 250 kb/sec, the system may submit one or more messages that collectively encodes 250*100/1000=25 kb of data. More generally, if an initial message is sent and the response time measured to be L, a function f( ) to describe the amount of data to send to measure latency at a particular bandwidth input value can be described as:

$$f(BW_{in})=L*BW_{in}$$

In some embodiments, the bandwidth input value is determined, the size of the sent message is determined, and arbitrary data (e.g., data whose value is not relevant beyond its size in bytes) is prepended or otherwise transmitted. For example, if the default size of a message is 32 bytes and bandwidth input is 128 bytes, the message can be prepended with 96 bytes of random data (96-byte array of 0's or 1's, 96 bytes of uninitialized data, etc.) or can be preceded by one or more data messages that are collectively 96 bytes in size. While the contents of the data may not be read, transmitting this data can be used to stress the network connection with the amount of data specified by the bandwidth input value. In some embodiments, the network connection may be stressed by adjusting the rate at which application data is sent. Thus, rather than (or in addition to) sending arbitrary data, the rate of sending data used by the application can be increased.

By stressing the network connection with a particular amount of data, the system is able to determine when the network connection is saturated (e.g., reaches capacity). Consider the case when the data connection is undersaturated when a message is sent—routers, switches, and computing entities over the network are able to submit the data as it is received and no additional latency is incurred through buffering or waiting for network resources to become available. However, consider the case when the data connection is oversaturated when a message is sent—the message can be queued behind other data that is being processed in the oversaturated scenario, thereby incurring additional latency. However, it should be noted that in many system latency measurements are stochastic in nature—that is, that a network having a latency of L may return different latency measurements $l_1, l_2, l_3 \ldots$ which are normally distributed around a mean value of L.

Accordingly, in systems where network latency measurements are subject to variance it can be difficult to determine whether the latency at a first bandwidth input value is higher than that of a second bandwidth input value at least because the difference between the two values could be due to variance. However, statistical techniques can be used to determine, at a confidence level (e.g., 90%, 95%, 99%, or higher) that a difference in latency measurements is due to a change in the underlying latency signal and not due to variance.

Returning to FIG. 2, a set of latency measurements can be obtained over successively increasing bandwidth input values. Note that the set need not be collected in a monotonically increasing or decreasing order, and it is sufficient for the set to include latency measurements at different bandwidth input values. The measurements can be collected over a short duration of time (e.g., hundreds or thousands of milliseconds) to reduce the chance and/or amount of change to network conditions as measurements are made. The measured latency values are analyzed using a statistical model. The statistical model can be abstracted to a two-variable plot of latency on one axis and bandwidth input on a second axis, to determine a correlation coefficient between the two variables. The correlation can be measured by calculating the Pearson product-moment correlation coefficient r over the set of latency values collected. If the correlation coefficient exceeds a threshold value that indicates that, with a confidence of 90%, 95%, 99%, etc., that there measured latency increases as bandwidth input increases, the system may reach a determination that the network is oversaturated. The determination can be that the network is oversaturated at the highest bandwidth input in the set of measurement, although other bandwidth input measurements can be used as well.

Once the system has determined that the network is oversaturated at a particular bandwidth input value, the system may determine the network capacity by measuring bandwidth output at the bandwidth input value. As noted above, the bandwidth input value used can be the highest bandwidth input value or another suitable value which was determined, with at least a certain confidence level, to be oversaturated based on a correlation coefficient that indicates an increase of latency in relation to an increase in bandwidth input. Measuring bandwidth output at the bandwidth input value, in an embodiment, is achieved by submitting data packets over the network at a rate of bandwidth input kb/sec to a counterparty with instructions for the counterparty to respond with corresponding data packets (e.g., echo packets). The data packets can be numbered sequentially, for example. The system may, after a short period of time after transmission, receive the responses and then measure the rate at which the response are received, thereby determining bandwidth output. Since the network connection was already determined to be oversaturated at the bandwidth input value, the measured data throughput is the capacity of the channel. In an embodiment, the system transmits n data packets of size m where n*m is an amount of data that is determined to be sufficient to oversaturate the network and requests the counterparty reply with corresponding data packets of the same size. The system may detect a first time $t_1$ that the first corresponding packet was received and a last time $t_n$ that the last corresponding data packet was received. The bandwidth capacity can be calculated as:

$$\text{network capacity } B = \frac{n*m}{t_n - t_1}$$

The system may make multiple measurements $b_1, b_2 \ldots$ and use various statistical techniques to determine the network capacity. For example, the system may continue to collect measurements $b_i$ until the confidence interval of the network capacity is within a certain window size. Accordingly, in networks that are subject to larger amounts of variance, more measurements can be taken to ensure that the calculated network capacity is accurate.

Thus, in the manner described above, the network capacity of the network connection can be obtained. As part of an oscillatory complementary network property calibration, the system, in turn, calibrate the network latency based on the bandwidth. The system may take a set of bandwidth measurements collected over samples of bandwidth input values that are less than the network capacity. The system may send data at a rate based on BW_in and the counterparty may respond with the data or other data that is of the same size. The bandwidth output measurement can be measured as described above in connection with determining the network capacity. Accordingly, a set of paired bandwidth output and bandwidth input values can be collected.

The set of bandwidth measurements can be collected over successively decreasing bandwidth input values and a statistical model is generated that models the relationship or correlation between bandwidth input and bandwidth output. In an embodiment, a correlation coefficient is calculated for the set. If the correlation coefficient exceeds a threshold value (e.g., indicating a strong positive correlation between bandwidth output and bandwidth input) the system may determine that the network bandwidth is undersaturated at the bandwidth input value. In other words, if there is the correlation coefficient is a large positive value (e.g., r≈1) it means that as the bandwidth input decreases, the bandwidth output also tends to decrease.

Once the system has determined that the network is undersaturated at a particular bandwidth input value, the system may determine the network latency by measuring latency at the bandwidth input value. As noted above, the bandwidth input value used can be the lowest bandwidth input value or another suitable value which was determined, with at least a certain confidence level, to be undersaturated based on a correlation coefficient that indicates a decrease in bandwidth output results from a decrease in bandwidth input. Measuring network latency at the bandwidth input value, in an embodiment, is achieved by submitting data over the network in connection with a data rate corresponding to bandwidth input. For example, the system may submit n messages of size m that correspond to the bandwidth input rate that was determined to undersaturate the network. Metrics relevant to the transmission of one or more of these messages can then be collected. For example, metrics (which may include measured observations of various system properties) might be collected for the last (i.e., n-th) message in the series of messages. The network latency may thus be described as:

$$\text{Network Latency } D = t_{n_{tx}} - t_{n_{rx}}$$

wherein the times indicated are the time when the last message was transmitted and when the response to the message was received.

Once the system has calculated both the network capacity and the network latency, the system may determine, with high confidence (e.g., as determined based on the statistical confidence levels that the system or network administrator can set) the bandwidth-delay product. The bandwidth-delay product may, accordingly, be described as:

$$\text{Bandwidth-Delay Product } BDP = B*D$$

Upon determining the bandwidth-delay product, the computer system may calibrate various computer-related functionality based on the bandwidth-delay product. For example, in the context of a multimedia stream such as those described elsewhere in this disclosure, a computer system may determine the bandwidth-delay product of a network and indicate to a content delivery network (CDN) or streaming service the network bandwidth-delay product. The data provider (e.g., a CDN) may receive the network bandwidth-delay product and utilize the bandwidth-delay product to determine how much data can be in flight over the network at a given time before the client acknowledges receiving the data. In a TCP-based connection, the bandwidth-delay product can be used to calibrate the amount of data that is sent over the connection per acknowledgement. The techniques described in connection with FIG. 2 can be implemented by computing entities such as those described in connection with FIG. 1.

It should be noted that some oscillatory complementary network property calibration techniques described in this disclosure discuss measuring network latency as a first step, it need not be the first step as the technique can be performed in different combinations and variations which can be suitable for different embodiments. For example, the system, in an embodiment, may first measure bandwidth output as a function of bandwidth input, starting from an initial value that is expected to be greater than the system's network capacity and performing steps 4-6 to determine the network latency and then performing steps 1-3 to determine the network capacity. Various other suitable implementations exist, and these steps can be applied in a cyclic manner—oscillating the bandwidth input to alternatively oversaturating and undersaturating the network connection in order to determine the network capacity and network latency, respectively.

Figure 3:
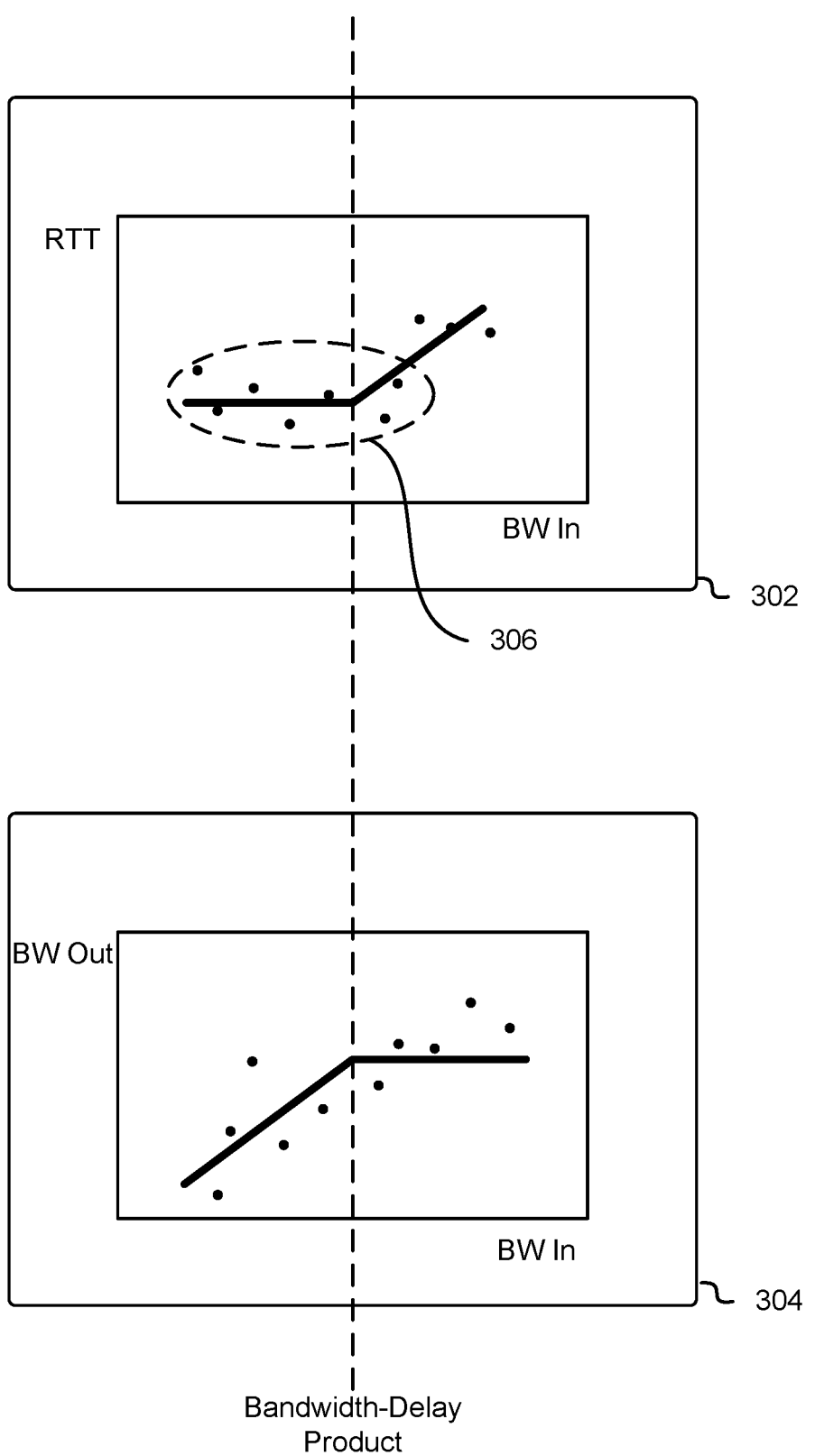
FIG. 3 shows an illustrative example of a diagram of the relationship between different network parameters that can be utilized as part of determining the bandwidth-delay product, in accordance with at least one embodiment.

FIG. 3 shows an illustrative example of a diagram 300 of the relationship between different network parameters that can be utilized as part of determining the bandwidth-delay product, in accordance with at least one embodiment. The diagram 300 can be used as part of modeling and/or statistical estimation techniques described elsewhere in this disclosure, such as in connection with FIG. 1, FIG. 2, and FIG. 5. In an embodiment, the lines (e.g., horizontal and sloped lines) are models that represent the modeled relationship between network properties and the dots represent illustrative examples of hypothetical sampled measurements. Note that the location of the dots are not necessarily to scale and may, for clarity, merely be representative.

A first network property relationship 302 is illustrated in FIG. 3 that shows how latency—also referred to as latency time, round-trip time (RTT), round-trip delay (RTD) time, etc. is related to certain network conditions. Generally speaking, the first network property relationship 302 illustrates that when the network is undersaturated, latency is constant or approximately constant. The network can be slightly upward slopping even when unsaturated in embodiments where the network connection is subject to stochastic loss. Measurements of latency time can be normally distributed around the modeled latency values. In an embodiment, when the bandwidth input is undersaturated, measured RTT values (e.g., represented by the dots illustrated in FIG. 3) are normally distributed around a RTT value L, wherein L represents a constant network latency expected when the network is not subject to buffering of data packets and other additional delays that may arise when the network connection is oversaturated. However, once bandwidth input exceeds the network capacity, then the round-trip time may increase. These increases can be due to various factors, such as delays related to queuing of data in routing devices, storing the data in and retrieving the data from short-term memory network, and more. In some embodiments, exceeding the network capacity by too much results in data being dropped, such as in the case when queues, buffers, or other temporary storage resources are exhausted.

A second network property relationship 304 is illustrated in FIG. 3 that shows bandwidth output is related to certain network conditions such as bandwidth input. For example, in the case of an undersaturated network, the relationship with bandwidth input and bandwidth output can be described as, or approximately as the following:

$$\text{Bandwidth}_{input} = \text{Bandwidth}_{output}$$

Note, however, that this relationship may make an assumption that there is zero stochastic loss in the system. Sources of stochastic loss may include random loss such as spectral interference, multipath interference/loss, ionospheric interference/loss, and/or variations thereof. When a transmission medium is subject to stochastic loss, there can be a non-zero probability p (i.e., 1≥p>0) that the units of data sent over the transmission medium are not received by the recipient. To account for stochastic loss at a rate of p, the relationship between bandwidth input and bandwidth output can be refined as:

$$\text{Bandwidth}_{input} = (1-p) \times \text{Bandwidth}_{output} \text{ where } 0 \le p \le 1$$

Unless indicated otherwise, stochastic loss is assumed to be less than 1 (i.e., a system in which all data transmitted not received by the recipient due to stochastic loss is generally not considered unless indicated otherwise).

In an embodiment, there may exist challenges surrounding determining the inflection point, the wherein the inflection point refers to the bandwidth input value in which the network is exactly at capacity (e.g., not oversaturated and not undersaturated). The inflection point may also be referred to as an operating point, bias point, or quiescent point. Without a priori knowledge of the bandwidth-delay product, it can be difficult to determine the network latency based on solely by measuring RTT values as a function of bandwidth input values. Consider the illustrated example in FIG. 3—systems that solely rely on RTT measurements to determine network latency may observe that network latency is relatively flat for a region 306 including the first seven measurements and overestimate the bandwidth input value at bandwidth-delay product. This would result in degraded performance, as the bandwidth input would result in an oversaturated network and higher than optimal latency times.

Figure 4:
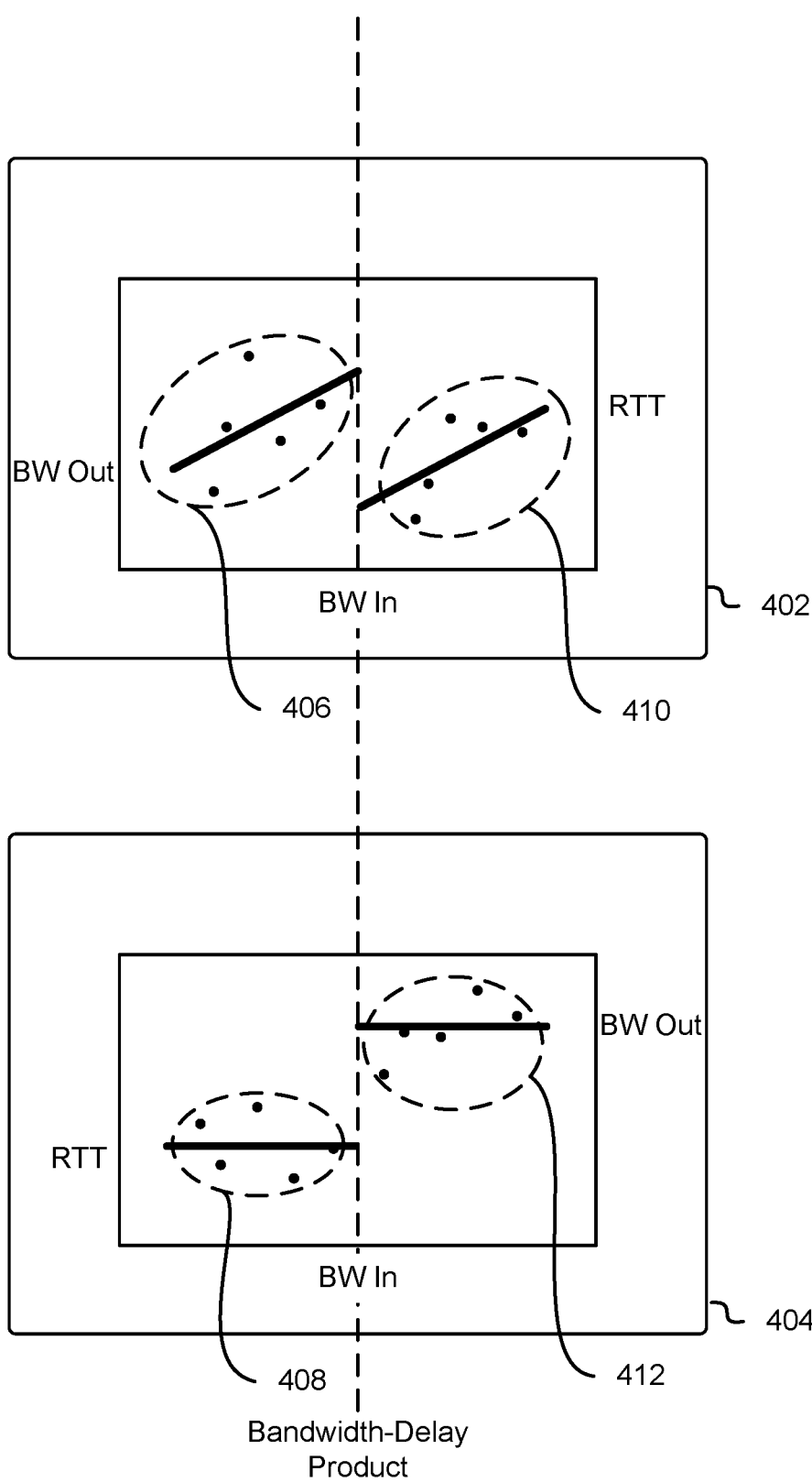
FIG. 4 shows an illustrative example of the relationship between different network parameters that can be utilized as part of determining the bandwidth-delay product, in accordance with at least one embodiment.

FIG. 4 shows an illustrative example of a diagram 400 of the relationship between different network parameters that can be utilized as part of determining the bandwidth-delay product, in accordance with at least one embodiment. The diagram 400 can be used as part of modeling and/or statistical estimation techniques described elsewhere in this disclosure, such as in connection with FIG. 1, FIG. 2, and FIG. 5. In an embodiment, the lines (e.g., horizontal and sloped lines) are models that represent the modeled relationship between network properties and the dots represent illustrative examples of hypothetical sampled measurements. Note that the location of the dots are not necessarily to scale and may, for clarity, merely be representative.

FIG. 4 illustrates how techniques described in this disclosure such as oscillatory complementary network property calibration can be utilized to improve the accuracy of calculating network parameters. The first graph 402 illustrates steps for detecting positive correlations for a network property and the second graph 404 illustrates steps for measuring or calculating the complementary network property. In an embodiment, the system collects measurements 406 of bandwidth output as a function of bandwidth input and uses statistical techniques such as regression analysis to detect that there is a positive correlation between bandwidth output and bandwidth input to determine that the network is undersaturated. Based on this determination, the system can collect samples 408 of latency at a point in which bandwidth input is undersaturated. Additionally, the system can collect measurements 410 of latency and detect an increase in latency as a function of bandwidth input. The increase in latency as a function of bandwidth input may indicate that the network is oversaturated, and the system can collect samples 412 of bandwidth output to determine the network capacity. In some embodiments, the samples 408 and/or 412 can be a single measurement.

Figure 5:
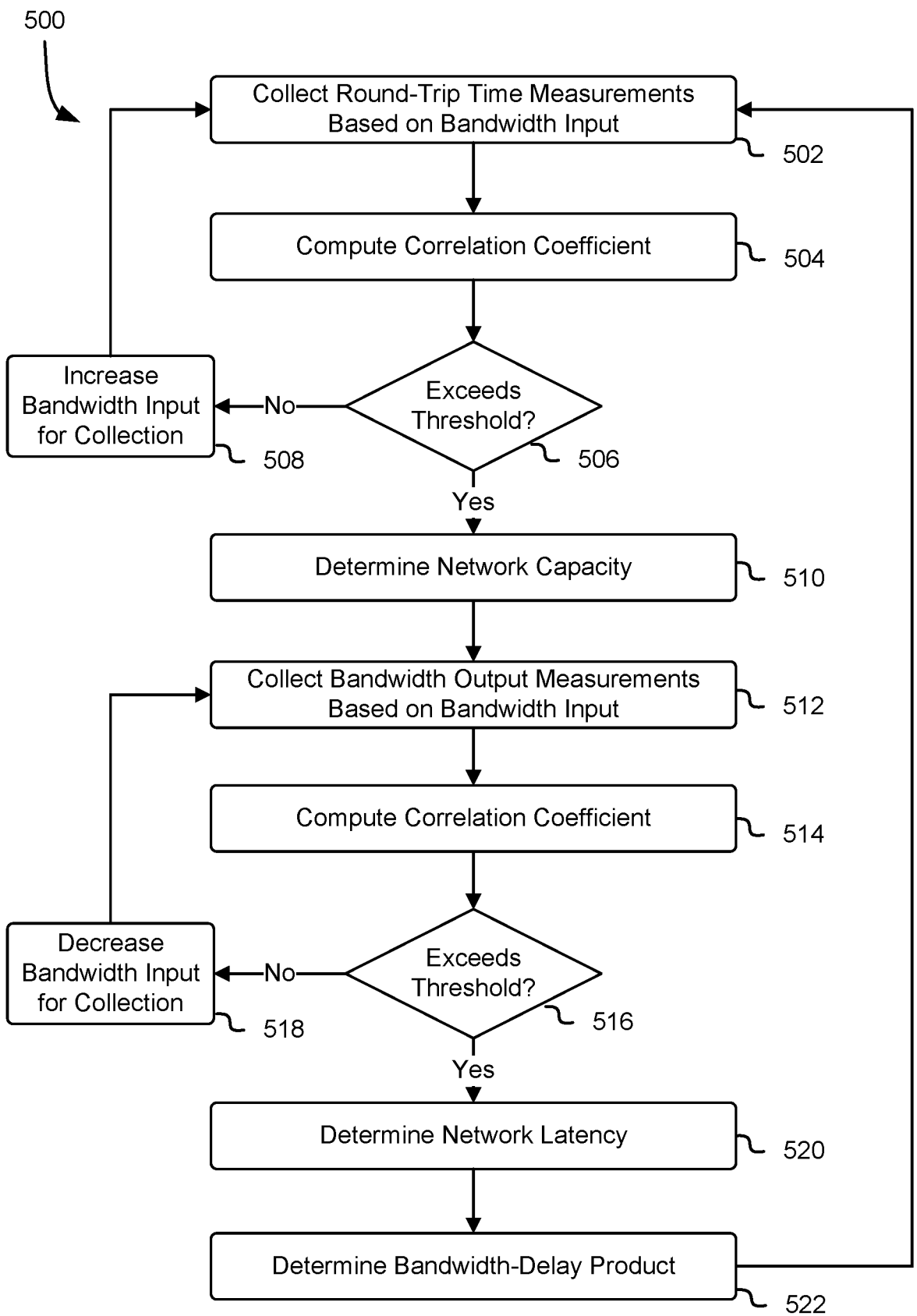
FIG. 5 shows an illustrative example of a process for calculating a bandwidth-delay product of a network connection in accordance with an embodiment.

FIG. 5 shows an illustrative example of a process 500 for calculating a bandwidth-delay product of a network connection in accordance with an embodiment. It should be noted that calculating, estimating, or otherwise determining the bandwidth-delay product of a network is a problem that is necessarily rooted in computer technology to overcome a problem specifically arising in the realm of computer networks. There may, throughout this disclosure, be techniques described herein, such as in connection with embodiments described in accordance with FIG. 5, that lack non-technical and/or non-computer analogies. Some or all of the process 500 (or any other processes described herein, or variations and/or combinations thereof) can be performed under the control of one or more computer systems configured with computer-executable instructions and can be implemented as code (e.g., computer-executable instructions, one or more computer programs, or one or more applications) executing collectively on one or more processors, by hardware, software, or combinations thereof. The code can be stored on a computer-readable storage medium, for example, in the form of a computer program comprising a plurality of computer-readable instructions executable by one or more processors. The computer-readable storage medium can be a non-transitory computer-readable medium. In some embodiments, at least some of the computer-readable instructions usable to perform the process 500 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

A system performing the process 500, in an embodiment, collects 502 round-trip time measurements based on bandwidth input. In an embodiment, the system selects an initial bandwidth input. The initial bandwidth input is selected, in an embodiment, based on a previously determined bandwidth-delay product point, an estimation of an expected bandwidth input value for which the network connection is undersaturated, and more. In an embodiment, the initial bandwidth input is initialized to start with empty messages such as a TCP segment comprising a header including metadata such as sender and recipient information and an empty data section that follows the header. In an embodiment, the empty message is a UDP datagram comprising an empty body field. In some embodiments, a minimal amount of data (e.g., 1-bit or 1-byte of data) can be included in a data body field, such as in cases where protocols or formats require that a data body field have a size that is greater than zero. The collection of round-trip time measurements may include one or more measurements of a RTT value and a corresponding bandwidth input value. The collected values can be successively increasing, or can be collected in other orders. The collection of values need not be stored, collected, or organized in a specific ordering.

In some embodiments, the number of measurements to collect is determined manually by a system or network administrator, programmatically based on statistical techniques to ensure a probability that the number of measurements taken is sufficient to determine a correlation coefficient that exceeds the threshold, and more. The number of measurements can be determined to be a fixed number. The number of measurements can be determined based on a network latency or estimated network latency so that the collection is performed within a ceiling time or has a probability of being performed within the ceiling high that is sufficiently high. The ceiling time can be determined based on being able to perform oscillations at a predetermined or dynamically determined rate (e.g., 50 oscillations per minute).

Once the measurements are collected, the system may compute 504 a correlation coefficient using the measurements. The correlation coefficient can be calculated using statistical techniques to determine the degree to which there is a linear fit or relationship between two variables such measured RTT values and bandwidth input values. Techniques described elsewhere in this disclosure can be utilized such as those discussed in connection with FIGS. 1 and 2. The correlation coefficient can be calculated to be value between −1 and 1.

The system may determine whether 506 the correlation coefficient calculated in step 504 exceeds a threshold. If the correlation coefficient does not exceed the threshold value (e.g., indicating that there is a strong positive correlation between RTT and bandwidth input) then it can be an indication that there is not strong enough of a statistical inference that RTT is increasing as bandwidth input increase over the bandwidth input values that the latency was collected over. As a result of determining that the correlation coefficient did not exceed the threshold value or probability, the system may increase 508 the bandwidth input values to make another collection. The steps 502-506 can be repeated again over a different range of bandwidth input values which may have some overlap with the previously collected measurements. Another correlation coefficient can be computed based on the new set of measurements.

When the system determines that the correlation coefficient exceeds the threshold, the system may determine 510 the network capacity using a bandwidth input value based on those from the collected measurements. In an embodiment, the system uses a bandwidth input value that is equal to the largest bandwidth input value from the collection. In an embodiment, the system uses a bandwidth input value that exceeds the largest bandwidth input value. One or more samples of bandwidth output can be collected at the selected bandwidth input value to determine the network capacity.

The system may collect 512 bandwidth output measurements based on bandwidth input. The bandwidth input values can be selected based on previously collected bandwidth output values such that the input values selected for measurement do not overlap with those that were included in the set of measurements used to determine a positive correlation between RTT and bandwidth input. The measurements collected in step 512 can be used to compute 514 a correlation coefficient that indicates whether bandwidth output is proportional correlated to bandwidth input. In other words, whether decreasing bandwidth input tends to result in a decrease in bandwidth output. The system may determine whether 516 the correlation coefficient exceeds a threshold which can be selected using principles and techniques described elsewhere. If the measured correlation coefficient is not sufficiently positive, the system may decrease 518 the bandwidth input values and collect a new set of measurements. In some embodiments, measurements from a previous collect can be re-used in subsequent collections. The steps 512-516 can be repeated.

Once the system determines that a computed linear correlation coefficient between bandwidth input and bandwidth output is sufficient positive, the system may determine 520 network latency by sampling one or more RTT values at a bandwidth input value where the system has determined there is a sufficient high statistical confidence that there is a positive correlation between bandwidth output and bandwidth input. The system may collect multiple samples and calculate the network latency using statistical techniques. Once the network capacity and network latency are known, the system may determine 522 the bandwidth-delay product by multiplying the network capacity and network capacity values. The bandwidth-delay product can be used to calibrate the rate at which a data stream such as a multimedia stream sends and/or receives data thereby increasing the amount of data that is transmitted. For a multimedia stream, the result can be that viewers experience higher quality video and/or audio based on factors such as resolution, bitrate, framerate, dropped frames, buffering, and more.

Variations on processes described in connection with FIG. 5 are also contemplated within the scope of this disclosure. For example, the system may first compute the network latency by performing steps 512-520 and then compute the network capacity by performing steps 502-510. In some embodiments, various steps such as statistical analyses to determine correlation coefficients can be performed in parallel.

In some embodiments, the system performs continuous oscillatory complementary network property calibration by, after determining the bandwidth-delay product, repeating steps 502-520 so that the calculated bandwidth-delay product value is updated. In dynamic systems, the bandwidth-delay product may change over time, so continuously performing oscillatory complementary network property calibration may result in more accurate measurement of network conditions.

It should be noted that, although FIG. 5 pertains to an example process 500 for calculating a bandwidth-delay product, the techniques described may be applicable to a number of scenarios in which there are observable complementary network properties. More generally, the example process 500 might be adapted to scenarios in which there are observable complementary system properties.

Figure 6:
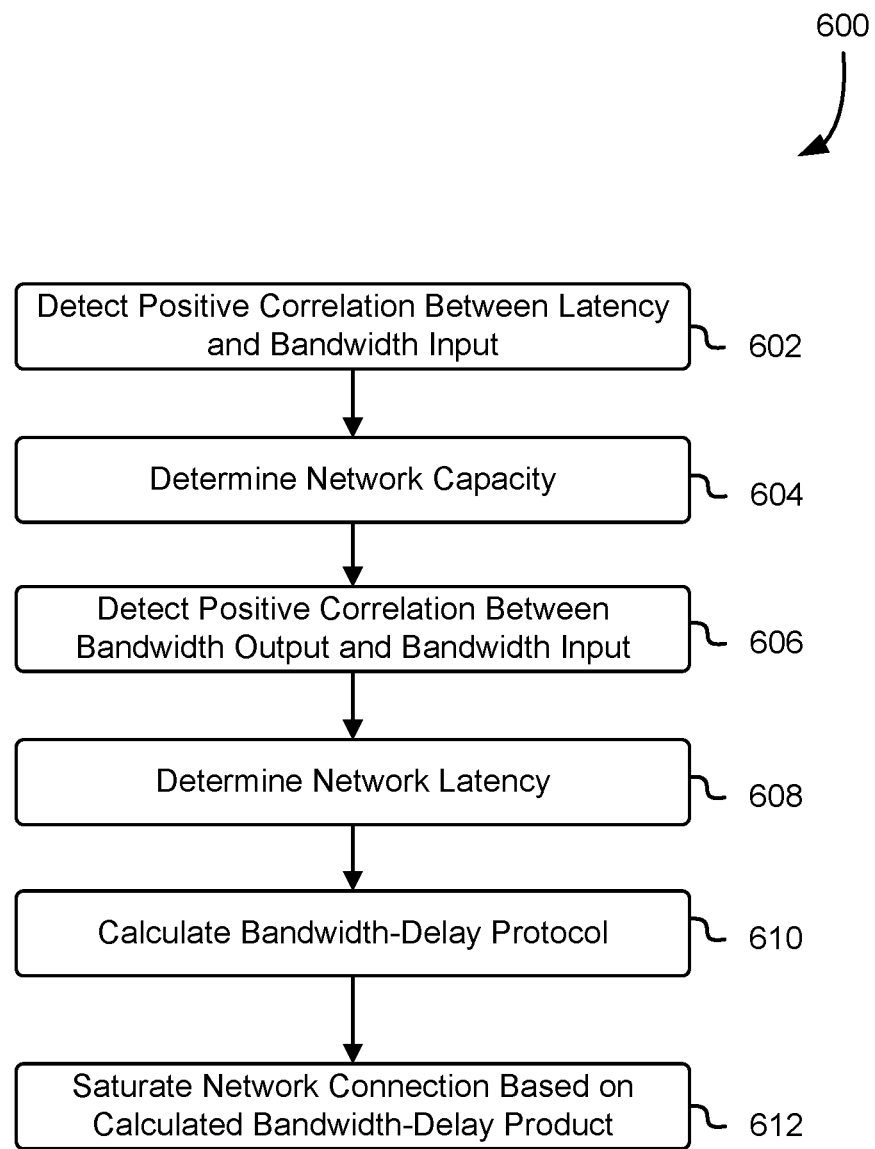
FIG. 6 shows an illustrative example of a process for saturating a network connection in accordance with an embodiment.

FIG. 6 shows an illustrative example of a process 600 for saturating a network connection in accordance with an embodiment. It should be noted that saturating a network is a problem that is necessarily rooted in computer technology to overcome a problem specifically arising in the realm of computer networks. There may, throughout this disclosure, be techniques described herein, such as in connection with embodiments described in accordance with FIG. 6 that lack non-technical and/or non-computer analogies. Some or all of the process 600 (or any other processes described herein, or variations and/or combinations thereof) can be performed under the control of one or more computer systems configured with computer-executable instructions and can be implemented as code (e.g., computer-executable instructions, one or more computer programs, or one or more applications) executing collectively on one or more processors, by hardware, software, or combinations thereof. The code can be stored on a computer-readable storage medium, for example, in the form of a computer program comprising a plurality of computer-readable instructions executable by one or more processors. The computer-readable storage medium can be a non-transitory computer-readable medium. In some embodiments, at least some of the computer-readable instructions usable to perform the process 600 are not stored solely using transitory signals (e.g., a propagating transient electric or electromagnetic transmission). A non-transitory computer-readable medium may include non-transitory data storage circuitry (e.g., buffers, caches, and queues) within transceivers of transitory signals.

The system performing the process 600 can be in accordance with those described in connection with FIG. 5. In an embodiment, the system detects 602 a positive correlation between latency and bandwidth input. In an embodiment, the correlation is to exceed a threshold value or probability. This step can be performed in accordance with those discussed in connection with FIGS. 1-5. In an embodiment, as a result of determining the positive correlation between latency and bandwidth input, the system may determine 604 the network capacity such as by utilizing techniques described in connection with FIGS. 1-5. In an embodiment, a positive correlation between latency and bandwidth input is an indication that the network is oversaturated.

The system may also, either before or after determining the network latency, detect 606 a positive correlation between bandwidth output and bandwidth input using techniques described in connection with FIGS. 1-5. For example, the system may collect a plurality of measurements of bandwidth output at evenly spaced out bandwidth input values. The positive correlation between bandwidth output and bandwidth input can be utilized to determine a bandwidth input value at which the network is, at a high probability, undersaturated and the system may calculate 608 the network latency based on network conditions for which the network connection is undersaturated. The system may calculate 610 the bandwidth-delay product based on the determined network capacity and network latency. In an embodiment, the system then saturates 612 the network by transmitting data over the network at a rate and/or amount based the bandwidth-delay product.

Figure 7:
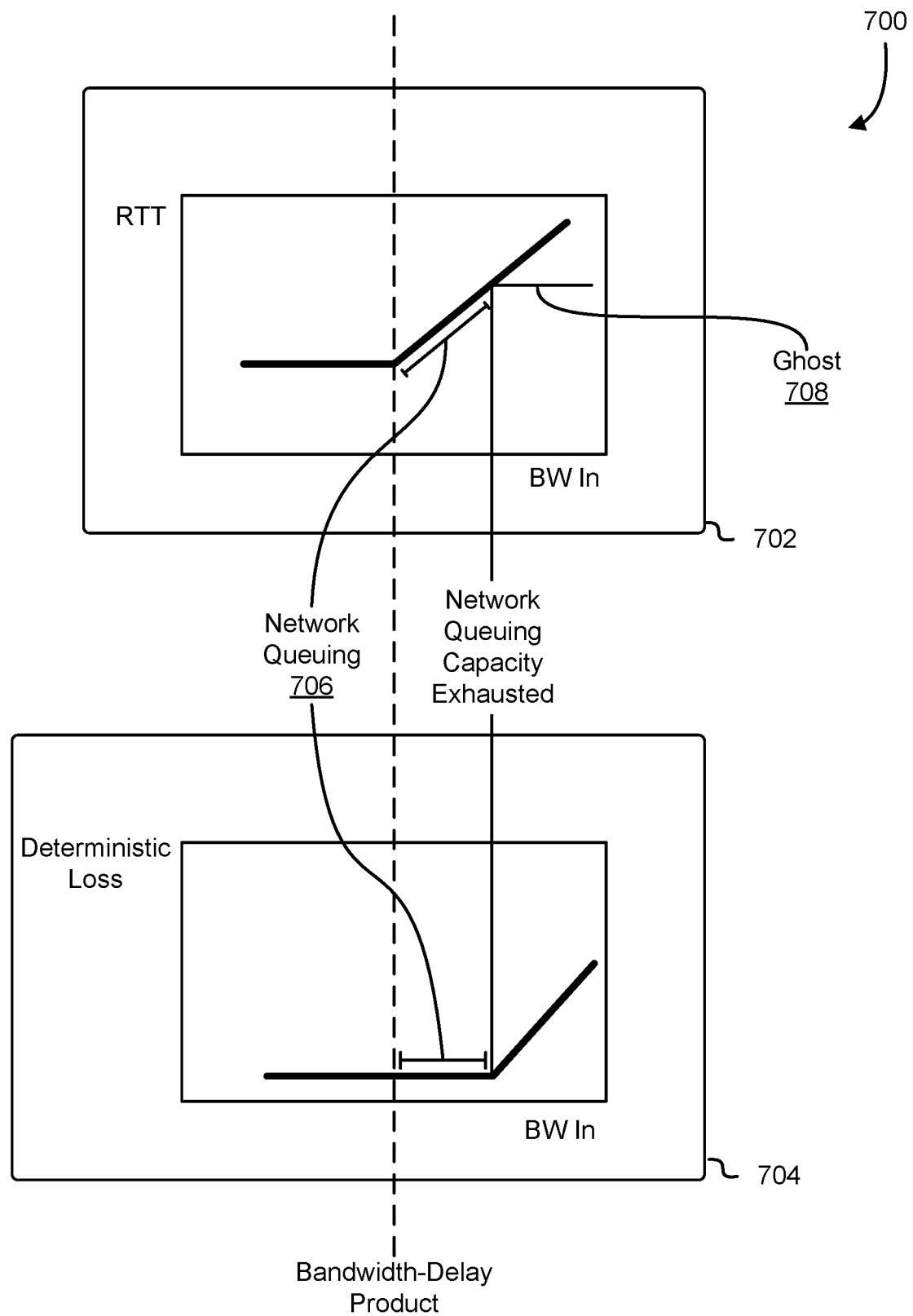
FIG. 7 shows an illustrative example of the relationship between different network parameters that can be utilized as part of determining network properties, in accordance with at least one embodiment.

FIG. 7 shows an illustrative example of a diagram 700 of the relationship between different network parameters that can be utilized as part of determining network properties, in accordance with at least one embodiment. A first network property relationship 302 is illustrated in FIG. 3 that shows how latency—also referred to as latency time, round-trip time (RTT), round-trip delay (RTD) time, etc. is related to certain network conditions. The relationship 702 can be in accordance with those discussed in connection with FIG. 3, for example.

FIG. 7 further illustrates, in accordance with at least one embodiment, how additional network parameters or properties can be measured, such as deterministic loss, network queuing capacity, and more. In an embodiment, the second network property relationship 704 illustrates a model of deterministic loss as a function of bandwidth input. Deterministic loss can be understood in light of network loss in the sense that the deterministic loss is a function of loss determinable based on factors that are controllable or manageable by network entities. Deterministic loss can be contrasted to stochastic loss, which can be the result of environmental factors such as spectral interference, multipath interference/loss, ionospheric interference/loss, and/or variations thereof). One source of deterministic loss, in an embodiment, results from dropped packets as a result of the network buffers not being able to accommodate those packets. For example, if a system submits data that is in excess of the network capacity, routing devices of the network such as routers and switches may begin to buffer the excess data and send the data when additional bandwidth becomes available (e.g., as a result of having transmitted other data). This buffering or storing of networking data in temporary storage structures of routing devices along the network can be referred to as network queuing 706. Continuing with the example, if a routing device continues to receive data faster than it is able to route or transmit the data, caches and other types of temporary storage resources can be exhausted, at which point additional data received by the device can be discarded, dropped, or otherwise lost. It should be noted that content such data may not be irrevocably lost, as the content can be re-transmitted, for example, based on the sender not receiving an acknowledge from the intended recipient of the data. The intended recipient of the data can be determinable from packet header data.

When the queuing capacity of routing devices along the network has been exhausted, transmission of additional data can result in data being discarded. The aforementioned devices along the network can be inclusive of or exclusive of the intended recipient device. In some embodiments, the ghost 708 refers to modeling of round-trip time or latency as a function of the bandwidth input. When the network is oversaturated and the network queuing capacity is exhausted, the latency of received packets can be constant or approximately constant as additional bandwidth is pushed through the network—this can be because the additional data is simply being discarded at a point along the network. However, this flatness may cause difficulties in making a determination of the network being oversaturated based on techniques that rely on detecting a positive correlation between RTT and bandwidth input. In various embodiments, the RTT is modified or normalized to account for dropped packets—for example, dropped packets can be factored into measurements by including a penalty that adjusts the collected RTT value to be higher when it is analyzed using statistical techniques such as regression analysis. Accordingly, a positive correlation can still be detected even when the network connection is oversaturated and network queuing capacity is exhausted, at least because increasing bandwidth input beyond that point would result in additional dropped packets, which would increase the penalty factor. The penalty can be modeled as follows:

$$RTT_{adjusted} = RTT_{measured} r^{*}P \text{ where } 0 < r \leq 1, 0 < P$$

where $RTT_{adjusted}$ refers to the RTT value that is used to determine the correlation coefficient, $RTT_{measured}$ refers to the measured network latency, r refers to the rate of data loss, and P refers to a penalty factor. In some embodiments, r refers to the rate of deterministic loss and is modeled to be zero or approximately zero when the network queuing capacity is not exhausted. Techniques described in connection with FIG. 7 can be utilized in connection with embodiments described elsewhere in this disclosure, such as those discussed in connection with FIGS. 1-6, 8, and 14. For example, in connection with FIG. 2 and/or FIG. 5, the step for measuring the network latency may include an additional step of adding a penalty factor that is greater than or equal to zero based on how much data loss was measured. In some embodiments, the deterministic loss is modeled to be zero or approximately zero when the network is undersaturated and/or oversaturated with available network queuing capacity. In some embodiments, techniques for oscillatory complementary network property calibration such as those discussed in connection can be utilized to measure latency and deterministic loss as a function of bandwidth input.

Figure 8:
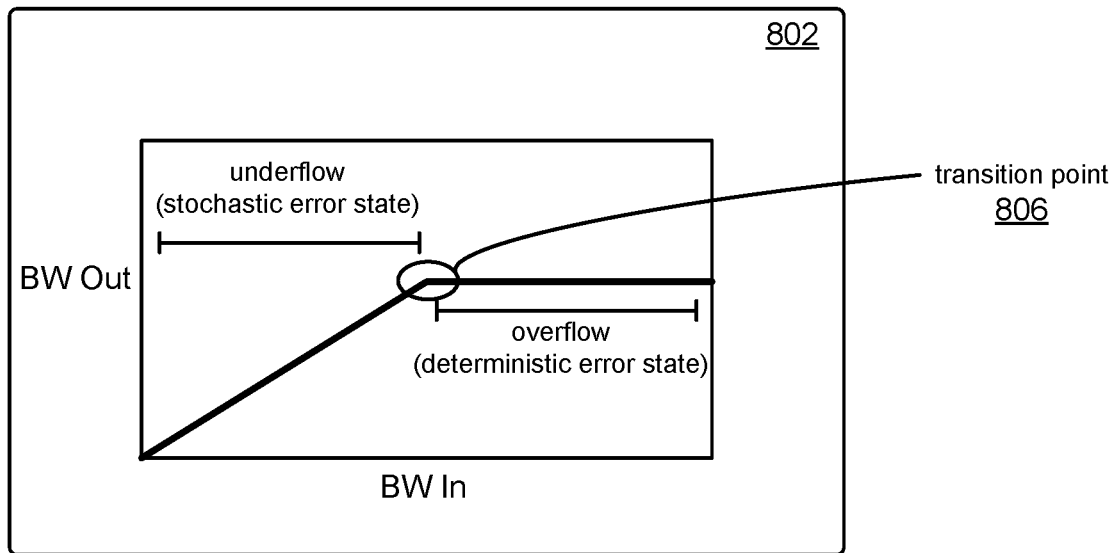
FIG. 8 shows an illustrative example of identifying changed network conditions, in accordance with at least one embodiment.
Figure 8:
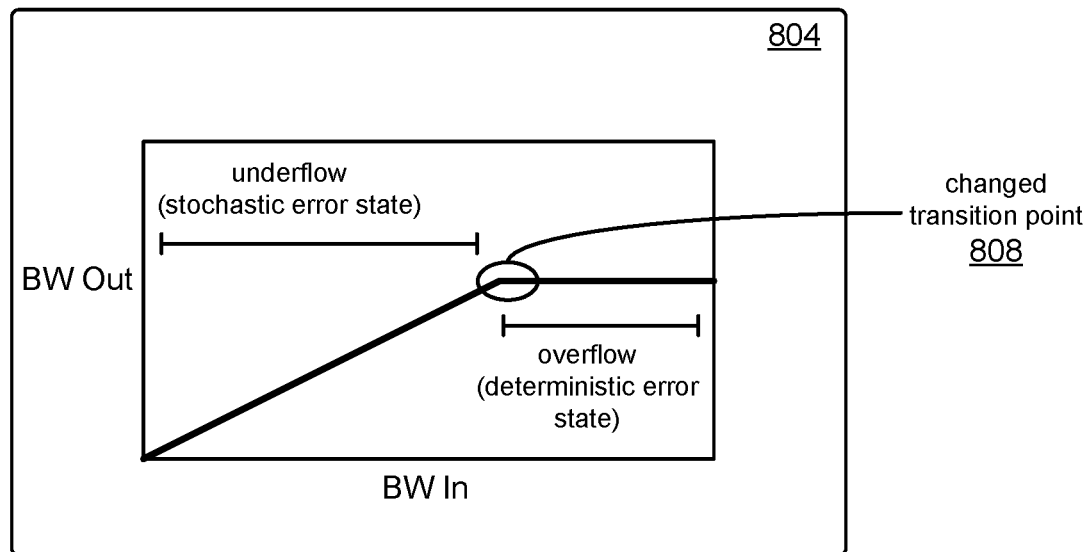

FIG. 8 shows an illustrative example of identifying changed network conditions, in accordance with at least one embodiment. As depicted in the first graph 802, bandwidth output may be expressed as a function of bandwidth input. The depicted output function comprises an underflow region and an overflow region. In the underflow region, bandwidth output increases linearly as a function of bandwidth input. In the overflow region, bandwidth output does not increase linearly, but is instead constrained by network conditions.

The underflow region may be associated with a stochastic error state. For example, the variance of an associated metric may have a Gaussian distribution around an expected value or trend line. In the overflow state, the variance of the metric may change. For example, the variance may become non-Gaussian, or comprise a significant non-random component.

A transition point 806 exists between the underflow and overflow regions, and likewise between the stochastic and deterministic error states. As described herein, a network system performing adjustments to transmission parameters may discover the location of the transition point 806, at which the stochastic error state transitions to the deterministic error state, or vice versa. The transition point of the error states may correspond to the transition between the overflow and underflow states, and as such may be used to identify the point at which overflow may begin to occur. In some embodiments, as discussed above, queuing may occur when the system enters an overflow state, but the capacity of the system to queue may eventually be exhausted as bandwidth input increases. Embodiments may oscillate within the queuing range in order to prevent data loss or other consequences of queue overflow, or may take actions to compensate for queue overflow, such as re-transmitting lost data.

As depicted in FIG. 8, the transition point 808 of the second graph 804 may be different than that of the transition point 806 in the first graph 802. This may result, for example, by changed network conditions, such as external traffic, failed or restored network components, and so on. By performing oscillatory adjustments to a transmission parameter, a system may detect the shift of the transition point 808, and thereby also infer that the point at which the system begins to enter the overflow state has changed.

Figure 9:
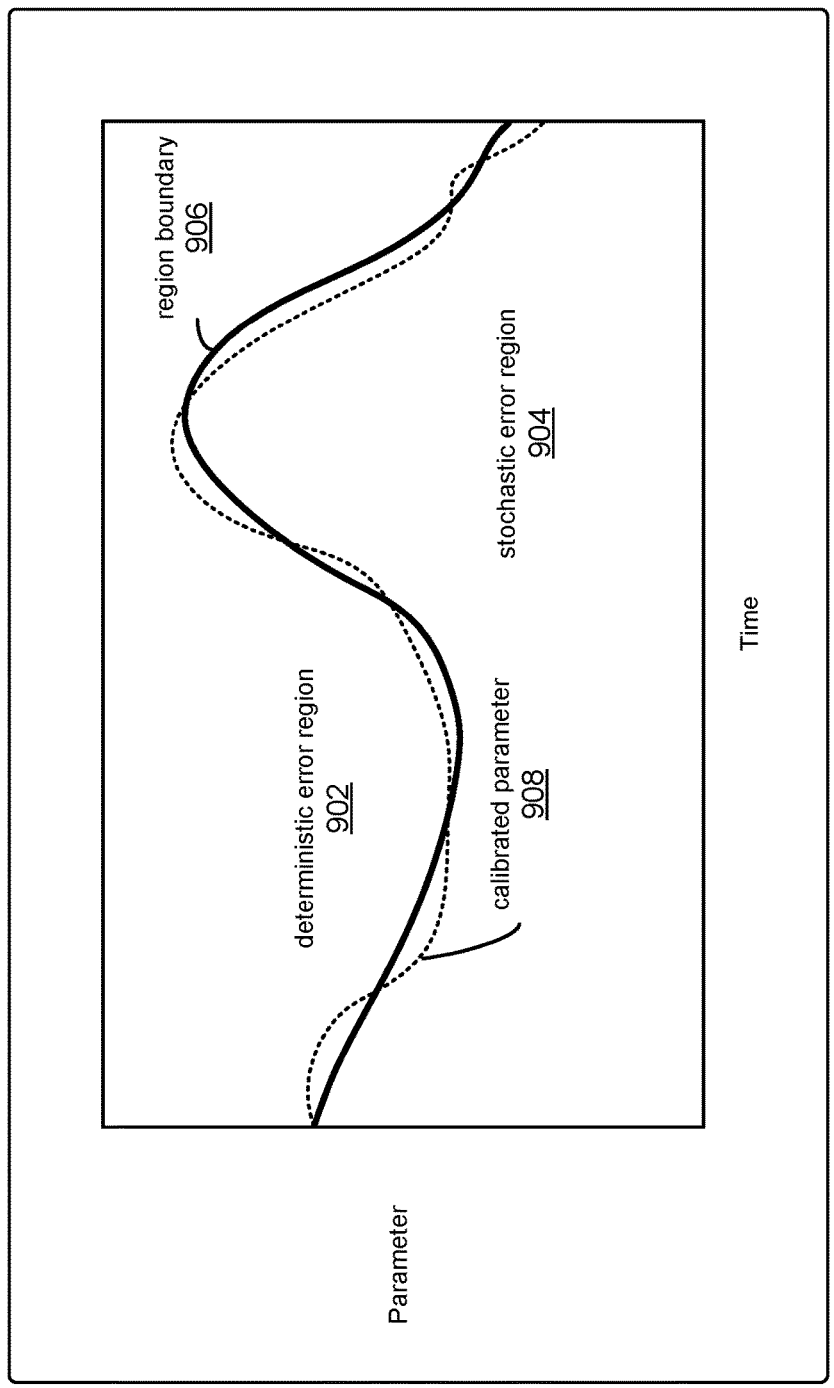
FIG. 9 shows an illustrative example of continuous network calibration, in accordance with at least one embodiment.
Figure 10:
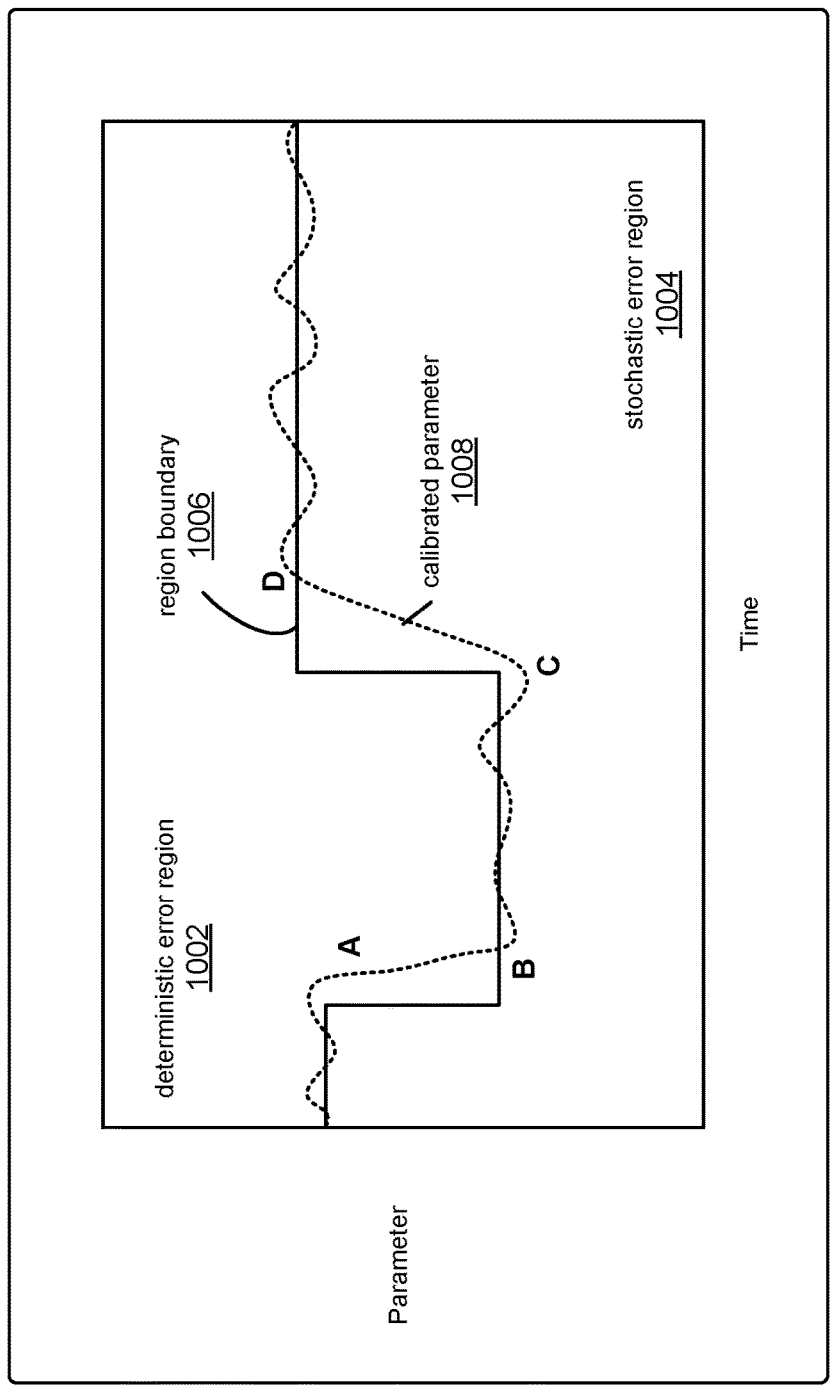
FIG. 10 shows further aspects of an illustrative example of continuous network calibration, in accordance with at least one embodiment.

This continuation calibration process may be further understood in view of FIGS. 9 and 10. These figures illustrate examples of continuous calibration, in accordance with one or more embodiments. Continuous calibration refers to an ongoing process in which a calibration of the system is performed on a basis which is at least periodic, or frequent with respect to the rate at which the state of the associated system may change.

FIG. 9 shows an illustrative example of continuous calibration, in accordance with at least one embodiment. In the graph 900, a system performing continuous calibration adjusts the value of a calibrated parameter 908 over time. The adjustments may be made continuously or on a periodic basis.

The value of the calibrated parameter 908 may be related to another metric. For example, bandwidth input may be related to network latency, such that network latency might be predicted as a function of bandwidth input. However, the actual values of network latency may exhibit variance against predicted values. This difference may be described as an error in the prediction. A region boundary 906 divides a deterministic error region 902 and a stochastic error region 904. In the deterministic error region 902, the differences between predicted and actual values for the related metric exhibit a deterministic pattern. Similarly, in the stochastic error region 904, the differences between predicted and actual values for the related metric exhibit a stochastic pattern. The boundary between the regions 902, 904 may be indicative of a boundary between operating conditions, such as between overflow or underflow states.

As seen in the graph 900, the actual boundary 906 between these regions may fluctuate over time, and may be difficult to predict. However, by oscillating the value of the calibrated parameter 908, the boundary may be tracked. For example, the calibrated parameter 908 might initially be such that the system is driven into a state in which the related metric exhibits a deterministic error. This might correspond to an overflow state. The system may adjust the parameter value downwards until a stochastic error is observed. The system might then be in an underflow state. At this point, the parameter might be adjusted upwards, so that the related metric again exhibits a deterministic error. In this manner, the region boundary 906 can be estimated.

FIG. 10 shows further aspects of an illustrative example of continuous network calibration, in accordance with at least one embodiment. Similar to FIG. 9, the graph 1000 of FIG. 10 shows how a region boundary 1006 between a deterministic error region 1002 and a stochastic error region 1004 may change over time. The graph 1000 further shows how this boundary may exhibit sudden shifts. These shifts may be indicative of a change in the operating state of the associated system.

In order to adapt more quickly to a sudden and significant shift in the region boundary 1006, a system employing the disclosed calibration techniques may further employ a seeking technique, in which the system more aggressively seeks a transition point between the two regions. For example, at position "A," the system may determine to employ a more aggressive seeking behavior, by making more significant adjustments to the calibrated parameter 1008 than is done during normal oscillation, until the region boundary 1006 is found again at point B. At point B, the less aggressive oscillating pattern resumes. Likewise, a similar process of adjustment, in the opposite direction, may be repeated at points C and D.

In an embodiment, the system employs this seeking behavior begins after a threshold number of adjustments have been made without identifying the transition point. The number of adjustments may be obtained experimentally. In an embodiment, between 5 and 10 adjustments are made in oscillation mode that may be described as ordinary oscillation or non-aggressive oscillation, in which the adjustments are relatively minor. If the boundary is not found, the ordinary oscillation mode is followed by the more aggressive "seeking" mode of oscillation, until the boundary is again found. Accordingly, in embodiments, the transmission of application data can be adjusted based on the number of prior adjustments made without causing or identifying a transition between states.

As noted, these techniques may be employed by adjusting the calibrated parameter during transmission of application data, rather than by employing separate probes. In embodiments, this may lead to the dual benefits of eliminating the impact of network probing on the system, and permitting the system to respond more quickly to state changes.

Figure 11:
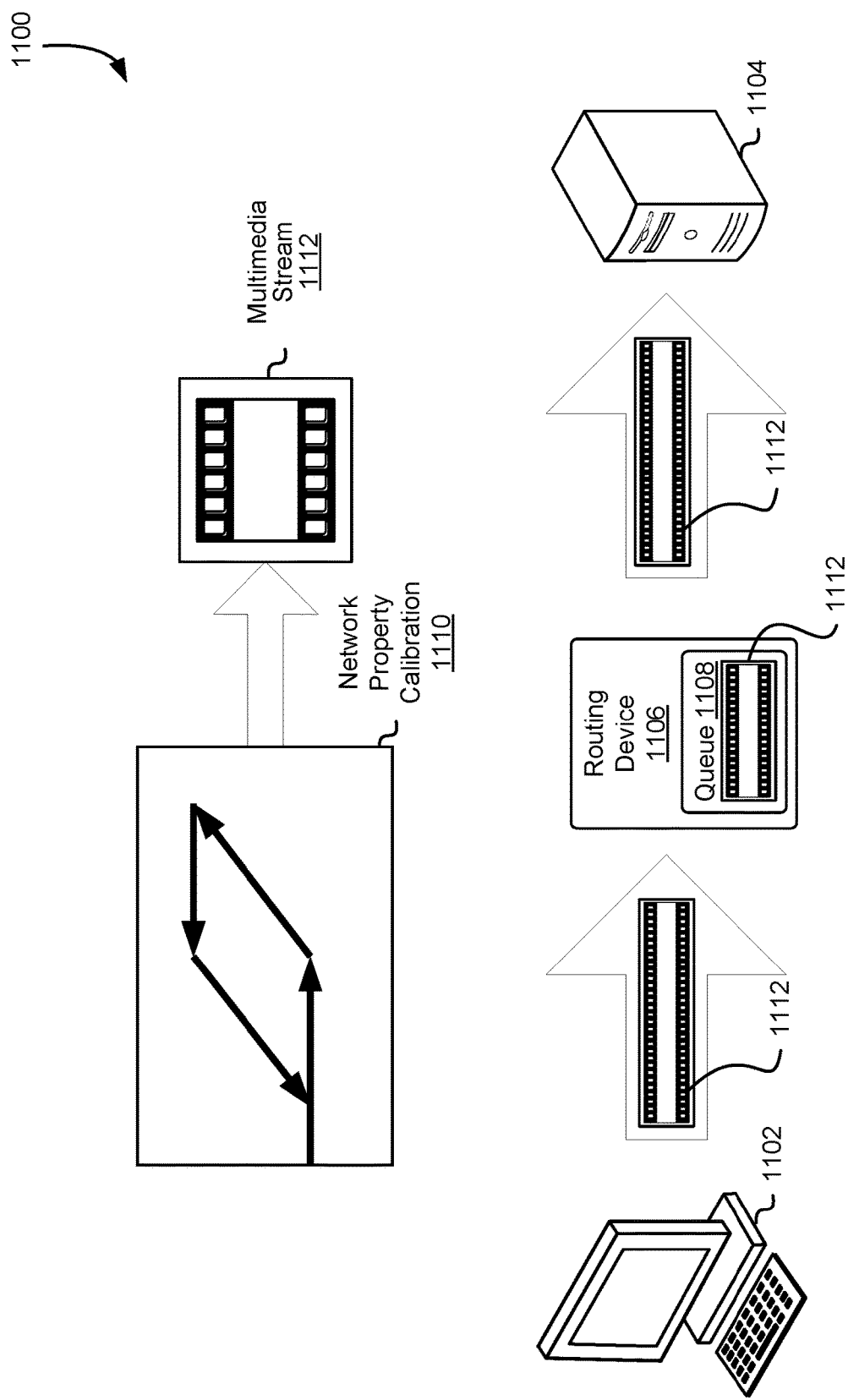
FIG. 11 shows an illustrative example of a computing environment in which data can be transmitted in a manner that exceeds the ostensible network capacity, in accordance with at least one embodiment.

The aforementioned techniques may be employed to improve utilization of a network in a computing environment. FIG. 11 shows an illustrative example of a computing environment 1100 in which data can be transmitted in a manner that exceeds the ostensible network capacity, in accordance with at least one embodiment. The computing environment 1100 may include a first computer system 1102 and a second computer system 1104 that are connected via a network such as the Internet. One or more routing devices 1106 can be utilized to connect the first computer system 1102 with the second computer system 1104. The first computer system 1102 and/or the second computer system 1104 can be configured in the manner described elsewhere in this disclosure, such as those described in connection with FIG. 2 and FIG. 5. In an embodiment, the first computer system 1102 is a data provider computer system and the second computer is a data receiver computer system.

In an embodiment, the routing device 1106 is a computer system such as a router or switch that is configured with executable code that, if run by one or more processors of the device, cause the one or more processors to receive and transmit data. The routing devices may include tables that encode data for routing data across a network such as the Internet. The routing device 1106 may include memory that is allocated for a temporary storage structure such as a queue 1108 although any suitable data structure can be utilized to implement the temporary storage structure such as an array, vector, list, stack, and more. In an embodiment, a network such as the Internet includes multiple routing devices and the queuing capacity may refer to the amount of temporary storage capacity that the routing devices of the network are collectively capable of storing.

Techniques such as those described in connection with FIG. 2 can be utilized by a computer system such as the first computer system 1102 to determine the bandwidth capacity of the network. Techniques such as those described in connection with FIG. 7 can be utilized by a computer system such as the first computer system 1102 to determine the queuing capacity of the network. In some embodiments, the system determines an amount of data that can be burst across the network. The burst may include transmission of an amount of data that is equal to the network capacity plus the queuing capacity. In an embodiment, exceeds the network capacity but does not exceed a rate that would result in the network queues being exhausted (which may result in data being dropped). More generally, techniques such as those described in relation to FIG. 10 can be employed to perform continuous calibration based on the described oscillatory technique.

In an embodiment, the first computer system 1102 performs techniques described herein such as an oscillatory complementary network property calibration 1110 that is used to determine network properties such as the network latency, network capacity, and network queuing capacity. The system may utilize this information to determine an amount of data to send. The data can, in some embodiments, be a variable bitrate multimedia stream 1112 whose bitrate is determined based on bandwidth-delay product determined by the oscillatory complementary network property calibration. In an embodiment, the data includes multimedia content. The amount of data to send can be greater than the ostensible network capacity and exceed the ostensible network capacity by less than the amount of queuing capacity on the network. As the network connection is saturated, additional data is temporarily stored by the routing devices in one or more queues, which are transmitted as network capacity becomes available again. In this way, the first computer system 1102, in some embodiments, determines a rate to transmit data in excess of the ostensible network capacity, transmits the data at the determined rate, and the second computer system 1104 receives all of the data transmitted without any data having been lost. This technique relies on continuous or periodic calibration, without which the actual (as opposed to ostensible) network capacity might be exceeded.

The aforementioned techniques may be employed to improve network transmission in a variety of transmission modes. Examples of such transmission modes include one-to-one, one-to-many, and many-to-one. FIG. 11 provides an example of one-to-one communication. An example of a one-to-many transmission mode is one in which a single source transmits data to a number of recipients. For example, a video or game streaming service might transmit audiovisual data from a single source to a large number of clients. The techniques described herein may be employed to continuously calibrate various parameters related to the transmission from the service to the clients, such as parameters related to the quality of audio or video, the maximum number of participants, and so forth. Regarding many-to-one transmission, an example includes a server application which receives data from a variety of clients. It will be appreciated that the examples given are intended to be illustrative, and as such should not be construed so as to limit the scope of the present disclosure to only those embodiments that practice the specific examples provided.

Figure 12:
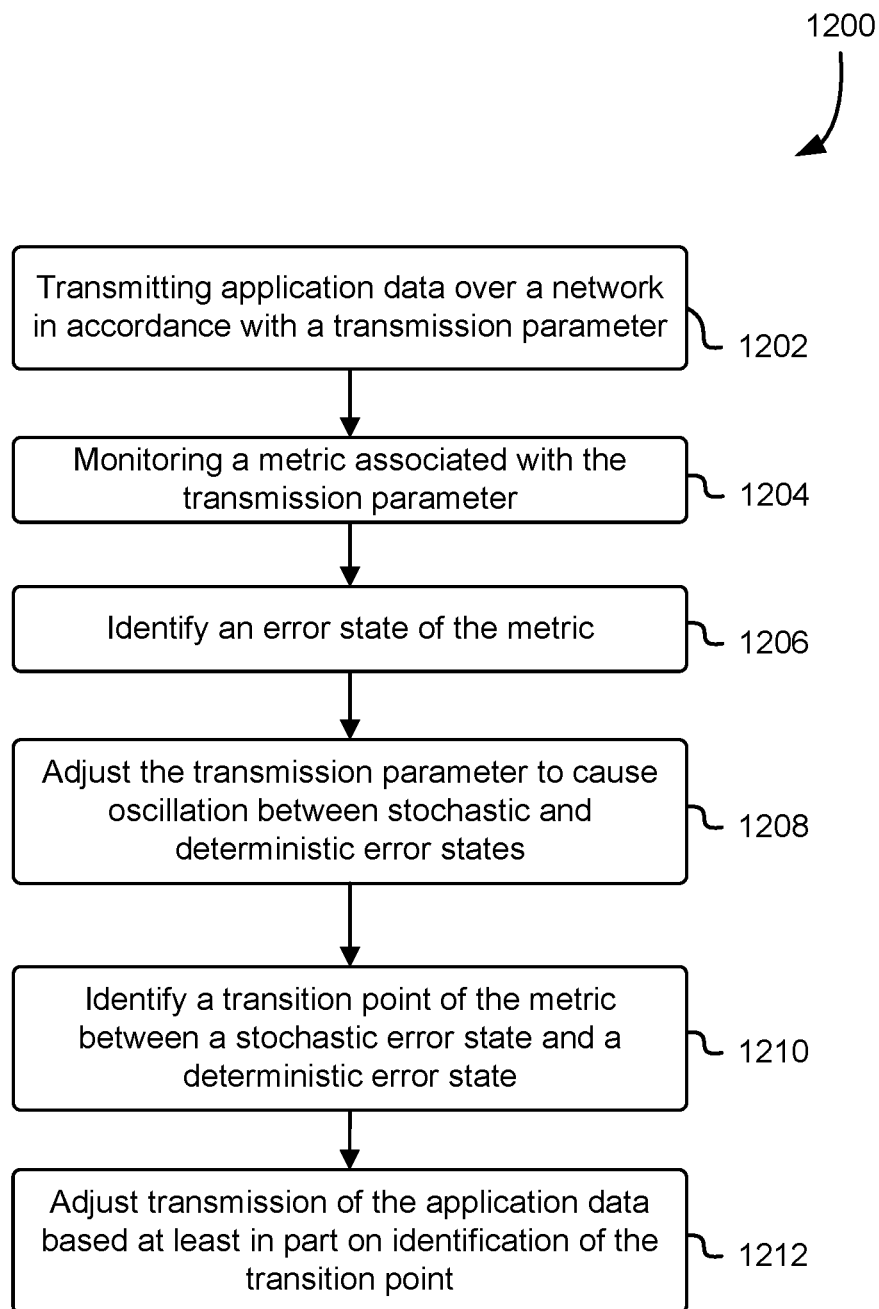
FIG. 12 shows an illustrative example of a process for continuous calibration of a network system, in accordance with at least one embodiment.

FIG. 12 shows an illustrative example of a process for continuous calibration of a network system, in accordance with at least one embodiment. Although FIG. 12 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

Figure 14:
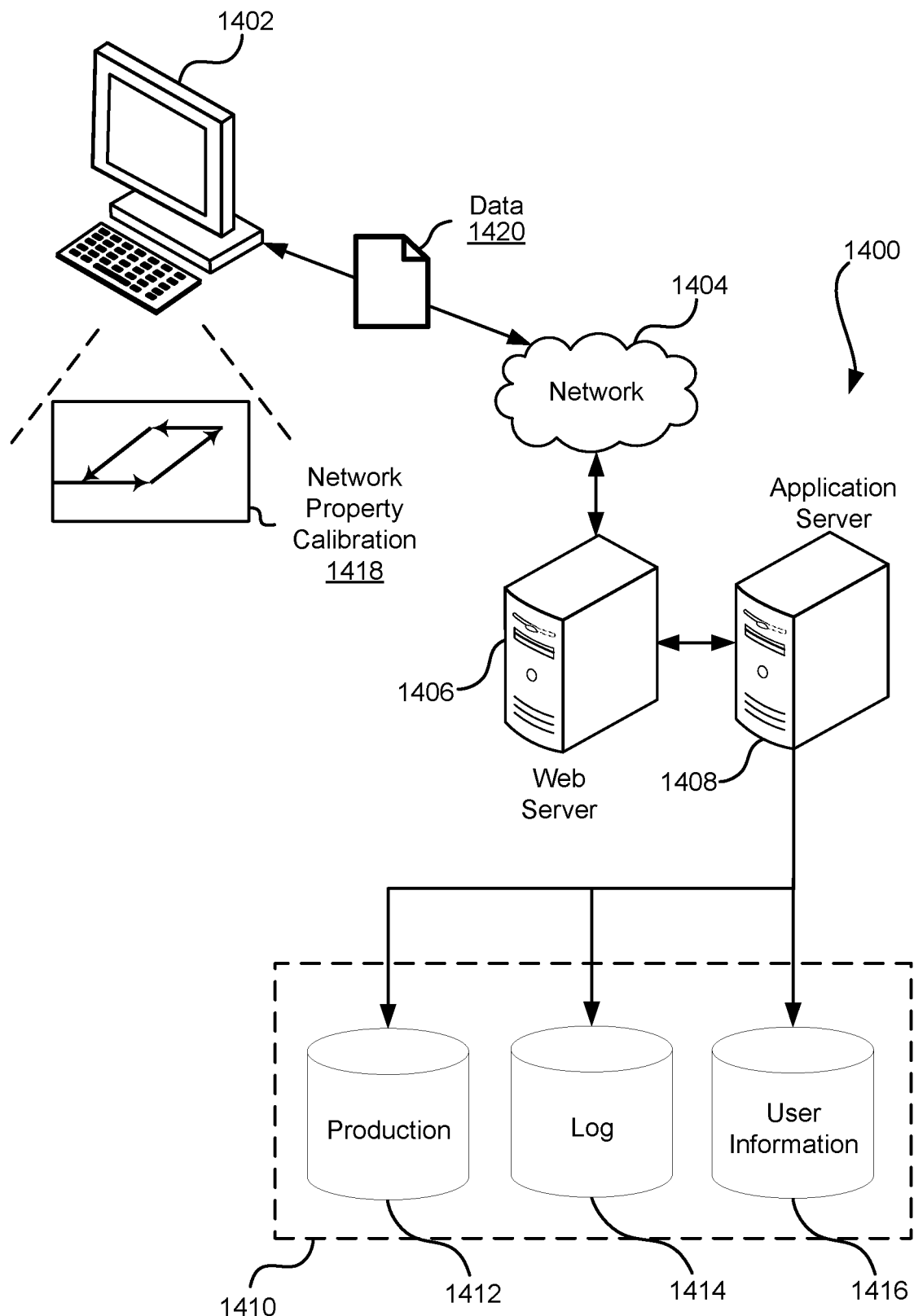
FIG. 14 illustrates a system in which various embodiments can be implemented.

The example process 1200 may be performed by any of a variety of systems and devices, such as those depicted in FIGS. 1, 11, and 14. Suitable systems and devices include network-connected computing devices, network routers, network hubs, and other suitably equipped data transmission devices.

At 1202, the system or device transmits application data over a network in accordance with a transmission parameter. The transmission parameter may be associated with a first of a pair of complementary network properties, and is generally selected based on its ability to influence this property. The second property of the pair may be tracked by monitoring a metric associated with, e.g., indicative of, the second property. In FIG. 12, this is depicted by step 1204.

For example, the transmission parameter may be a system or device property that influences the consumption of output bandwidth. The system or device might then utilize a network property complementary to output bandwidth, such as input bandwidth, to search for a transition point between stochastic and deterministic error states.

At 1206, the system or device identifies an error state of the metric. The system or device may, for example, predict the value of the metric based on the relationship between the complementary network properties. An error can be calculated based on deviation between the observed value of the metric and the predicted value. The distribution of these errors can then be analyzed to determine whether the error is stochastic or deterministic.

In embodiments, the system or device may identify an underflow or overflow state based on identifying the error state. For example, the system or device may infer, from the identification of a stochastic error state, that the system or device is in an underflow state. Similarly, the system or device may infer, from the identification of a deterministic error state, that the system or device is in an overflow state. As described herein, for example with respect to FIG. 8, there may be correlation between a stochastic error state and an underflow state, and correlation between a deterministic error state and an overflow state.

At 1208, the system or device adjusts the transmission parameter to cause oscillation between stochastic and deterministic error states of the metric. When in a stochastic error state, the system or device may adjust the transmission parameter so that the system seeks a deterministic state. Likewise, when in a deterministic error state, the system or device may adjust the transmission parameter so that the system seeks a stochastic error state.

In embodiments, the system causes the parameter to oscillate on a periodic basis. Here, the use of the term period should not be construed so as to imply that the period of oscillation between stochastic and deterministic states occurs on a fixed period, but rather that the system adjusts the transmission parameter on at least a semi-regular bases. Adjustments may be made, in some embodiments, on an effectively continuous basis. Note that rather than involving the use of probes or pings, the systems and devices may use adjustments to the transmission of application data to detect the state changes.

At 1210, the system or device identifies a transition point between stochastic and deterministic error states of the metric. The system or device analyzes the distribution of errors, e.g., the difference between predicted and actual values of the metric, and determines whether the pattern or distribution of errors is stochastic or deterministic.

In embodiments, a system or device infers a related property based on the identified transition point. For example, the system or device may infer a bandwidth delay product as described with respect to FIGS. 2 and 3.

In embodiments, a system or device infers, from the identification of the transition point, a transition point between underflow and overflow state. FIG. 8, for example, describes how the system or device may infer the point at which a network will exhibit underflow or overflow, even as changing network conditions cause that point to shift.

At 1212, the system or device adjusts transmission of the application data, based at least in part on the identification of the transition point between the stochastic and deterministic errors states.

In embodiments, the system or device may exceed a predefined threshold for the transmission parameter, based on identification of the transition point. For example, given that the system may discover, through the oscillatory process, the point at which overflow will tend to occur, and broadcast data at a rate sufficient to saturate the network without causing problematic amounts of overflow. The system may, however, periodically cause small amounts of overflow to occur, due to the oscillation of the network parameter. In embodiments, the system may safely exceed a predefined threshold, such as those that might be imposed by the transmission control protocol ("TCP") standard.

Figure 13:
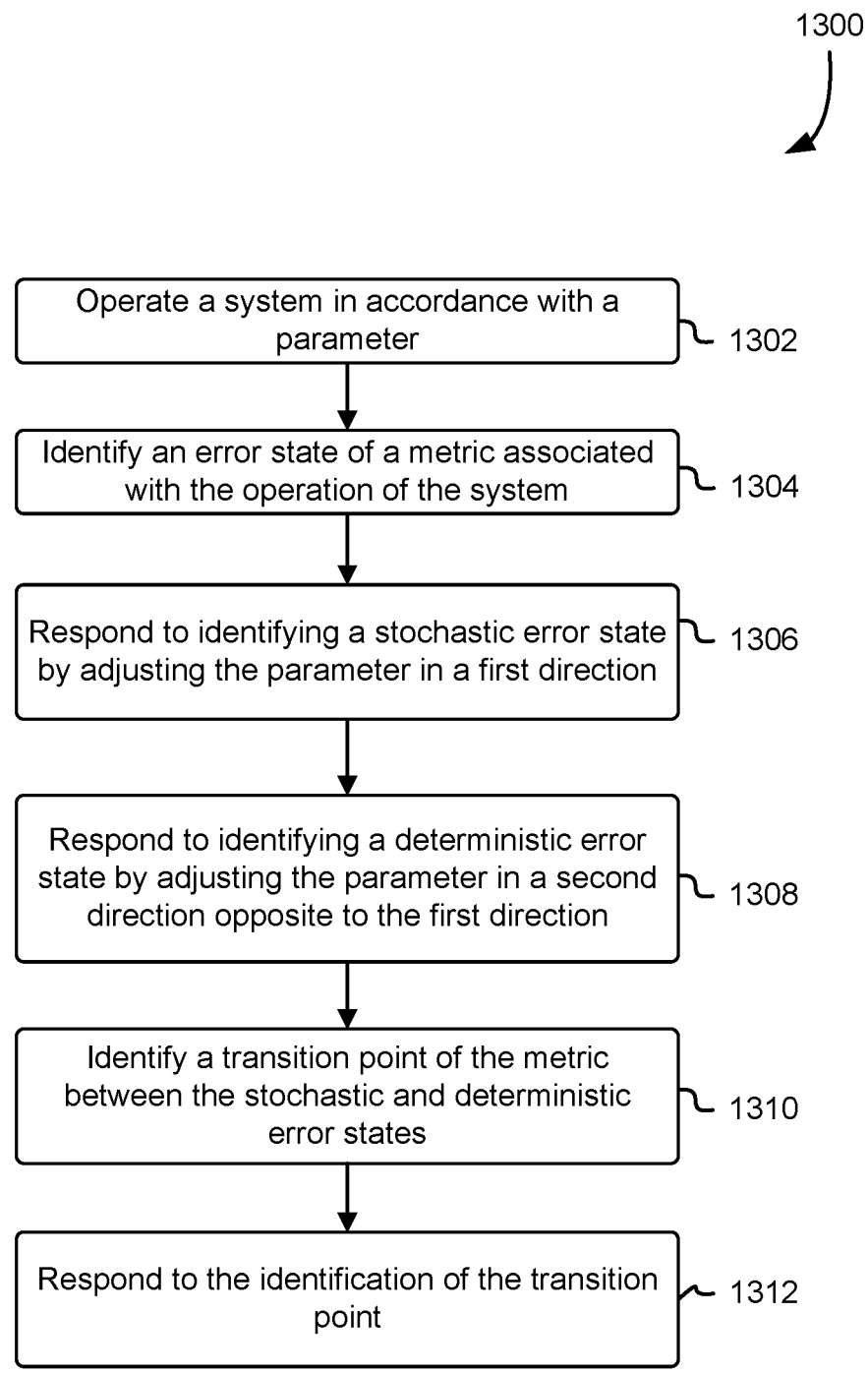
FIG. 13 shows an illustrative example of a process for determining an operational metric by oscillation of an operating parameter, in accordance with at least one embodiment.

FIG. 13 shows an illustrative example of a process for determining an operational metric by oscillation of an operating parameter, in accordance with at least one embodiment. Although FIG. 13 is depicted as a sequence of steps, the depicted sequence should not be construed as limiting the scope of the present disclosure to only those embodiments conforming to the depicted order. For example, unless otherwise indicated or clear from context (e.g., when the output of one step is used as input into another), at least some of the depicted steps may be reordered or performed in parallel.

The example process 1300 may be performed by any of a variety of systems and devices, such as those depicted in FIGS. 1, 11, and 14. Suitable systems and devices include network-connected computing devices, network routers, network hubs, and other suitably equipped data transmission devices.

At 1302, the system or device operates in accordance with a parameter. The selected parameter is associated with at least one of a pair of complementary properties, such that adjusting the operation of the device will cause a change in the property. The expected range of values for the complementary property would therefore also be influenced by the parameter.

At 1304, the system or device identifies an error state of a metric associated with the operation of the system, and with the complementary property. In other words, the metric collected is one which enables a determination of error distribution of the complementary network property. Analysis of the error state comprises determining whether the error distribution stochastic or deterministic.

At 1306, the system or device responds to identifying a stochastic error state by adjusting the parameter in a first direction. The direction is selected so as to cause the system to seek the boundary between the stochastic error state and a deterministic error state. For example, if the system is in an underflow state associated with stochastic error, increasing the output rate of the system may tend to move the system to an overflow state associated with deterministic error.

At 1308, the system or device responds to identifying a deterministic error state by adjusting the parameter in a second direction. The second direction is opposite to the first direction. As used herein, the terms and phrases opposite, oppositional, or in opposition to refer to the adjustment being generally or approximately in an opposing direction to the first direction.

For example, a system which makes slow upwards adjustments to the parameter while in a stochastic error state, but sharp downwards adjustments to the parameter while in a deterministic error state, would still be considered to be using opposite directions of adjustment.

At 1310, the system or device identifies a transition point between the stochastic and deterministic error states, using the various analysis techniques described herein.

At 1312, the system or device responds to the identification of the transition point. In embodiments, one such response is inferring, computing, or otherwise determining the value of a related property. For example, in a network system, a bandwidth delay product of the network might be determined based on the identified transition point.

Embodiments may also respond to the identification of the transition point by adjusting the operation of the system. For example, the system might determine to exceed a predefined threshold for the parameter, based on the dynamic understanding of operating conditions provided by the oscillatory analysis.

FIG. 14 illustrates aspects of an example system 1400 for implementing aspects in accordance with an embodiment. As will be appreciated, although a web-based system is used for purposes of explanation, different systems can be used, as appropriate, to implement various embodiments. In an embodiment, the system includes an electronic client device 1402, which includes any appropriate device operable to send and/or receive requests, messages, or information over an appropriate network 1404 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 1406 for receiving requests and serving content in response thereto, although for other networks an alternative device serving a similar purpose could be used as would be apparent to one of ordinary skill in the art. The web server 1406, in an embodiment, is an endpoint of communications sent from the electronic client device 1402. Alternatively, the application server 1408 is an endpoint. As such, the observed network properties may describe network conditions for the path between the electronic client device 1402 and the endpoint of the communication.

In an embodiment, the electronic client device 1402 performs network property calibration 1418 in accordance to the techniques described in this disclosure. For example, an application executing on the electronic client device 1402 may send application data using the oscillatory techniques described above, and thereby perform continuous, semi-continuous, or occasional monitoring of network conditions.

In an embodiment, the illustrative system includes at least one application server 1408 and a data store 1410 and it should be understood that there can be several application servers, layers or other elements, processes or components, which can be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 1402 and the application server 1408, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system. In an embodiment, the client device 1402 and the application server 1408 communicate via the network 1404. The client device 1402 and/or the application server 1408 can perform an oscillatory complementary network property calibration by utilizing techniques described in connection with FIGS. 1, 5, and 6 to determine the bandwidth delay product of the network connection between the client device 1402 and the application server 1408. The bandwidth-delay product can indicate an amount of data that can be transmitted across the network without increasing the latency of data transmitted across the network 1404. In an embodiment, the client device 1402 computes the bandwidth-delay product and sends and/or receives an amount or rate of data 1420 according to the determined bandwidth-delay product. The data 1420, in an embodiment, is a multimedia segment of a multimedia stream that is transmitted from the application server 1408 to the client device 1402 according to a bitrate that does not exceed the bandwidth-delay product.

The data store 1410, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 1412 and user information 1416, which are used to serve content for the production side. The data store also is shown to include a mechanism for storing log data 1414, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 1410.

The data store 1410, in an embodiment, is operable, through logic associated therewith, to receive instructions from the application server 1408 and obtain, update or otherwise process data in response thereto and the application server 1408 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 1402. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 1400 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 1400, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 14. Thus, the depiction of the system 1400 in FIG. 14 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, and software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, computing devices such as the depicted electronic client device 1402, web server 1406, and/or application server 1408 can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes can be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set can be equal.

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., can be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    at least one processor; and
    memory that stores computer-executable instructions that, in response to execution by the at least one processor, cause the system to:
        transmit application data over a network, wherein the system transmits the application data by at least oscillating a transmission parameter;
        monitor a network metric associated with the transmission parameter;
        identify a transition point of the network metric between a deterministic error state and a stochastic error state;
        infer a value of a network property based at least in part on the transition point; and
        adjust transmission of the application data based at least in part on the identified transition point and the inferred value of the network property, the adjustment causing oscillation of the network metric.

2. The system of claim 1, wherein identification of the transition point permits adjustment of the transmission of the application data to exceed a predefined threshold.

3. The system of claim 1, wherein the memory stores further computer-executable instructions that, in response to execution by the at least one processor, cause the system to identify an underflow state, the identification based at least in part on correlation between the underflow state and the stochastic error state.

4. The system of claim 1, wherein the memory stores further computer-executable instructions that, in response to execution by the at least one processor, cause the system to identify an overflow state, the identification based at least in part on correlation between the overflow state and the deterministic error state.

5. The system of claim 1, wherein oscillating the transmission parameter comprises at least periodic adjustment of the transmission parameter.

6. A computer-implemented method, comprising:
    transmitting application data, wherein the transmitting comprises oscillating a transmission parameter;
    monitoring a metric associated with the transmission parameter;
    identifying a transition point of the metric between a deterministic error state and a stochastic error state;
    inferring a value of a network property based at least in part on the transition point; and
    adjusting transmission of the application data based at least in part on the identified transition point and the inferred value, wherein adjusting of the transmission parameter causes oscillation of the metric between the deterministic error state and the stochastic error state.

7. The computer-implemented method of claim 6, wherein oscillating the transmission parameter comprises making at least periodic adjustments of the transmission parameter.

8. The computer-implemented method of claim 6, wherein adjusting transmission of the application data comprises a change to a rate at which the application data is transmitted.

9. The computer-implemented method of claim 6, further comprising determining to transmit the application data while exceeding a predefined threshold for the transmission parameter, based at least in part on identifying the transition point.

10. The computer-implemented method of claim 6, further comprising inferring a network state based at least in part on the identified transition point.

11. The computer-implemented method of claim 6, further comprising identifying an underflow state, the underflow state identified based at least in part on a correlation between the underflow state and the stochastic error state.

12. The computer-implemented method of claim 6, further comprising identifying an overflow state, the overflow state identified based at least in part on a correlation between the overflow state and the deterministic error state.

13. The computer-implemented method of claim 6, wherein oscillating the transmission parameter comprises adjusting the transmission parameter to cause the metric to tend towards the deterministic error state based on identifying a stochastic error state, and adjusting the transmission parameter to cause the metric to tend toward a stochastic error state based on identifying a deterministic error state.

14. The computer-implemented method of claim 6, wherein the transmission of the application data is adjusted based at least in part on prior adjustments made without causing a transition between states.

15. A non-transitory computer-readable storage medium comprising executable instructions that, as a result of being executed by one or more processors of a computer system, cause the computer system to at least:
    transmit application data in accordance with a transmission parameter;
    monitor a metric associated with the transmission parameter;
    infer a value of a network property based at least in part on a transition point of the metric between a deterministic error state and a stochastic error state; and
    adjust transmission of the application data in accordance with the transmission parameter and the inferred value, wherein the transmission is adjusted to cause the metric to oscillate between the deterministic error state and the stochastic error state.

16. The non-transitory computer-readable storage medium of claim 15, wherein oscillating the transmission parameter comprises at least periodic adjustment of the transmission parameter.

17. The non-transitory computer-readable storage medium of claim 15, wherein the instructions comprise further instructions that, as a result of execution by the one or more processors, cause the computer system to at least increase consumption of output bandwidth until the metric enters the deterministic error state.

18. The non-transitory computer-readable storage medium of claim 15, wherein the instructions comprise further instructions that, as a result of execution by the one or more processors, cause the computer system to at least determine to transmit the application data while exceeding a predefined threshold for the transmission parameter, based at least in part on identifying the transition point.

19. The non-transitory computer-readable storage medium of claim 15, wherein the instructions comprise further instructions that, as a result of execution by the one or more processors, cause the computer system to at least identify an underflow state, the underflow state identified based at least in part on a correlation between the underflow state and the stochastic error state.

20. The non-transitory computer-readable storage medium of claim 15, wherein the instructions comprise further instructions that, as a result of execution by the one or more processors, cause the computer system to at least identify an overflow state, the overflow state identified based at least in part on a correlation between the overflow state and the deterministic error state.

* * * * *